US012537156B2

(12) United States Patent
Wada et al.

(10) Patent No.: US 12,537,156 B2
(45) Date of Patent: Jan. 27, 2026

(54) PROTECTIVE ELEMENT

(71) Applicant: DEXERIALS CORPORATION, Shimotsuke (JP)

(72) Inventors: Yutaka Wada, Shimotsuke (JP); Yoshihiro Yoneda, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 220 days.

(21) Appl. No.: 17/925,133

(22) PCT Filed: May 26, 2021

(86) PCT No.: PCT/JP2021/019965

§ 371 (c)(1),
(2) Date: Nov. 14, 2022

(87) PCT Pub. No.: WO2021/241629

PCT Pub. Date: Dec. 2, 2021

(65) Prior Publication Data

US 2023/0197392 A1 Jun. 22, 2023

(30) Foreign Application Priority Data

May 29, 2020 (JP) ................................ 2020-094275

(51) Int. Cl.
*H01H 37/00* (2006.01)
*H01H 85/00* (2006.01)
*H01H 85/055* (2006.01)

(52) U.S. Cl.
CPC ........ *H01H 85/0039* (2013.01); *H01H 37/00* (2013.01); *H01H 85/055* (2013.01)

(58) Field of Classification Search
CPC ........ H01H 37/76–761; H01H 2037/762–763; H01H 2037/768; H01H 85/055;
(Continued)

(56) References Cited

U.S. PATENT DOCUMENTS 4,593,262 A * 6/1986 Krueger ............... H01H 85/303 337/183
6,194,988 B1 * 2/2001 Yamaguchi .......... H01H 39/006 200/61.08

(Continued)

FOREIGN PATENT DOCUMENTS

JP 2000021278 A 1/2000
JP 2005071925 A 3/2005

(Continued)

OTHER PUBLICATIONS

Office Action issued Apr. 16, 2024 in Japanese Patent Application No. 2020-094275 (with English translation), 10 pages.

(Continued)

*Primary Examiner* — Jacob R Crum
(74) *Attorney, Agent, or Firm* — Element IP, PLC

(57) ABSTRACT

A protective element includes a fuse element, a movable member, a concave member, and a press. The fuse member includes, a first end, a second end, and a cut part positioned between the first end and the second end. The fuse element is energized in a first direction from the first end to the second end. The movable member and the concave member are disposed facing each other such that the cut part is interposed therebetween. The press applies a force to the movable member in a pressing direction in which a distance between the movable member and the concave member shortens. At a temperature at or above a softening temperature of the fuse element, the cut part is cut by the force of the press.

17 Claims, 21 Drawing Sheets

(58) Field of Classification Search
CPC .. H01H 85/0039; H01H 39/00; H01H 39/006; H01H 2039/008
See application file for complete search history.

(56) References Cited

U.S. PATENT DOCUMENTS

| | | | | |
|---|---|---|---|---|
| 6,556,119 | B1 * | 4/2003 | Lell | H01H 37/323 337/182 |
| 2013/0220095 | A1 * | 8/2013 | Ukon | H01H 39/006 83/639.1 |
| 2015/0200065 | A1 | 7/2015 | Koetter et al. | |
| 2016/0240342 | A1 * | 8/2016 | Yoneda | H01H 85/08 |
| 2019/0287751 | A1 * | 9/2019 | Gonthier | H01H 85/0241 |
| 2020/0066465 | A1 * | 2/2020 | Moszynski | H01H 9/32 |
| 2021/0074502 | A1 | 3/2021 | Yoneda | |

FOREIGN PATENT DOCUMENTS

| | | | |
|---|---|---|---|
| JP | 4630403 | B2 | 2/2011 |
| JP | 5545721 | B2 | 7/2014 |
| JP | 5779477 | B2 | 9/2015 |
| JP | 6210647 | B2 | 10/2017 |
| WO | WO-2017061455 | A1 | 4/2017 |
| WO | WO-2019138752 | A1 | 7/2019 |

OTHER PUBLICATIONS

Written Opinion issued Aug. 10, 2021 in PCT/JP2021/019965 (with English translation), 8 pages.
International Search Report issued Aug. 10, 2021 in PCT/JP2021/019965 (with English translation), 6 pages.
Office Action issued Apr. 26, 2024 in Korean Patent Application No. 10-2022-7035659 (with English translation), 12 pages.
Combined Taiwanese Office Action and Search Report issued Nov. 8, 2024, in corresponding Taiwanese Patent Application No. 110119426 (with machine English translation), 21 pages.
Combined Taiwanese Office Action and Search Report issued Jun. 19, 2025, in corresponding Japanese Patent Application No. 110119426 (with machine English translation), 18 pages.

* cited by examiner

A-A'

PROTECTIVE ELEMENT

TECHNICAL FIELD

The preset invention relates to a protective element. The present application claims priority to JP 2020-094275 filed in Japan on May 29, 2020, and the contents thereof are incorporated herein by reference.

BACKGROUND TECHNOLOGY

Conventionally, there are fuse elements that heat up and melt during a current surge exceeding a rating, thereby cutting off a current path. A protective element (fuse element) provided with a fuse element is used, for example, in a battery pack that uses a lithium ion rechargeable battery.

In recent years, lithium ion rechargeable batteries have been used not only in mobile equipment, but in a wide range of fields such as those for electric vehicles and storage batteries. As such, the capacity of lithium ion rechargeable batteries is steadily increasing. Therefore, there is demand for a protective element installed in a battery pack having a large-capacity lithium ion battery or having a current path for high voltage and high current.

Conventionally, there have been protective elements that use spring power.

For example, Patent Document 1 discloses a short circuit switch in which a cutting plunger, which may be provided for cutting a cut region, can be pressed against a spring member in a resting position in advance.

Patent Document 2 discloses a protective element disposed between a pair of electrodes and provided with an elastic body to which a separating force is applied to a heat-generating piece. In addition, Patent Document 2 teaches a compression coil spring that separates a heat-generating piece from a positive electrode and a negative electrode when a joining material melts.

Patent Document 3 teaches a protective element having a movable conductor pressed by a conductive elastic body, a pair of lead terminals, and a meltable body fixing the movable conductor and joins the movable conductor and the lead terminals, wherein the junction melts at a melting temperature of the meltable body, moving the movable conductor via a pressing force of the elastic body and cutting off a circuit.

Patent Document 4 discloses a protective element provided with a compression spring, a force of which acts on a movable electrode to create separation from a lead fixed electrode, wherein, by melting an alloy having a low melting point, the movable electrode is pressed by the compression spring and separated from the lead fixed electrode.

CITATION LIST

Patent Documents

Patent Document 1: Japanese Patent No. 6210647
Patent Document 2: Japanese Patent No. 5779477
Patent Document 3: Japanese Patent No. 5545721
Patent Document 4: Japanese Patent No. 4630403

SUMMARY OF INVENTION

Problem to be Solved by Invention

In a protective element for high voltage, arc discharge may be generated when a fuse element melts. When arc discharge is generated, the fuse element may melt over a wide range and scatter vaporized metal. In this case, there is a risk of the scattered metal forming a new current pathway and of the scattered metal adhering to an electronic component around a terminal or the like.

In light of the circumstances described above, an object of the present invention is to provide a protective element capable of reducing arc discharge generated when a fuse element is cut and capable of suppressing continuation of the generated arc discharge.

Means to Solve the Problem

In order to solve the problems described above, the present invention proposes the following means.

[1] A protective element comprising a fuse element having a cut part between a first end and a second end, the fuse element being energized in a first direction from the first end to the second end;

a movable member and a concave member disposed facing each other such that the cut part is interposed therebetween; and pressing means that apply a force such that a relative distance in a direction in which the cut part is interposed between the movable member and the concave member shortens; wherein, at a temperature at or above a softening temperature of the fuse element, the cut part is cut by the force of the pressing means.

[2] The protective element according to [1], wherein a width of the cut part, which is a width in a second direction of the fuse element, the second direction crossing the first direction, is narrower than a width of a part other than the cut part.

[3] The protective element according to [1] or [2], wherein the cut part is disposed in a concave portion of the concave member in a plan view and is disposed at a position near an inner surface of the concave portion in the plan view, and a length in the second direction crossing the first direction of the concave portion is longer than a length in the second direction of the cut part.

[4] The protective element according to any of [1] to [3], further comprising a heating member disposed either contacting or near the cut part on a side of the pressing means or a side of the concave member of the fuse element.

[5] The protective element according to [4], wherein the heating member is disposed inside a concave portion of the concave member in a plan view.

[6] The protective element according to [5], wherein a length in the first direction of the heating member is shorter than a length of the concave portion in a third direction crossing the first direction and the second direction which crosses the first direction.

[7] The protective element according to any of [1] to [6], wherein the fuse element is a laminated body in which an inner layer is a metal having a low melting point and an outer layer is a metal having a high melting point.

[8] The protective element according to [7], wherein the metal having a low melting point is composed of Sn or a metal in which Sn is a primary component, and the metal having a high melting point is composed of Ag or Cu or a metal in which Ag or Cu is a primary component.

[9] The protective element according to any of [1] to [8], wherein the pressing means are a spring.

[10] The protective element according to [9], wherein the spring is conical and a side having a small outer diameter faces toward a side of the cut part.

[11] The protective element according to any of [1] to [10], wherein the movable member has a convex portion disposed at a position in which at least a portion of an area inside the concave portion of the concave member is overlapped with an outer periphery of the convex portion in a plan view, and the convex portion is inserted into the concave portion by the cut part being cut.

[12] The protective element according to any of [1] to [11], wherein a first terminal is electrically connected to the first end, and a second terminal is connected to the second end.

[13] The protective element according to any of [4] to [6], wherein the heating member has a resistor.

[14] The protective element according to [13], wherein the heating member is electrically connected to a third terminal or to the third terminal and a fourth terminal by an electrical supply member, and the resistor is heated by being energized through the electrical supply member.

[15] The protective element according to any of [1] to [14], comprising a case composed of a plurality of members in which at least the fuse element, the movable member, a concave portion of the concave member, and the pressing means are housed, wherein the pressing means are housed within the case in a state in which the force is applied such that the relative distance in the direction in which the cut part is interposed between the movable member and the concave member shortens.

[16] The protective element according to [15], wherein one member of the case comprises a housing part integrally formed, using one material, from a first inner wall surface and a second inner wall surface that face each other in an expanding and contracting direction of the pressing means and a side wall surface connecting the first inner wall surface and the second inner wall surface, and supporting and holding stress in the case generated by the pressing means in a staple shape by the first inner wall surface, the side wall surface, and the second inner wall surface in a state in which the fuse element is uncut.

[17] The protective element according to [15] or [16], wherein the concave member and the case are composed of nylon or ceramic.

[18] The protective element according to any of [1] to [17], wherein the cut part is disposed in a concave portion of the concave member in the plan view and is disposed at the position near an inner surface of the concave portion in the plan view, the movable member has a convex portion disposed at the position in which at least a portion of an area inside the concave portion of the concave member is overlapped with an outer periphery of the convex portion and in which the convex portion is overlapped with a portion of the cut part, in the plan view, and by the cut part being cut, the convex portion is inserted into the concave portion and a portion of the fuse element is bent so as to be housed within the concave portion.

Effect of the Invention

The protective element of the present invention is provided with a movable member and a concave member disposed facing each other such that a cut part of the fuse element is interposed therebetween, and pressing means that apply a force such that a relative distance in the direction in which the cut part is interposed between the movable member and the concave member shortens. Therefore, in the protective element of the present invention, at a temperature at or above a softening temperature of the fuse element, the cut part is cut by the force of the pressing means. Thus, in the protective element of the present invention, an amount of heat generated when the fuse element is cut can be reduced as well as arc discharge generated during cutting. Furthermore, in the protective element of the present invention, the cut fuse element is housed in the concave member together with the movable member through a pressing force of the pressing means. Thus, the distance between the cut surfaces of the cut fuse element is rapidly expanded. As a result, even when arc discharge is generated when the fuse element is cut, the arc discharge will be quickly reduced.

BRIEF DESCRIPTION OF THE DRAWINGS

FIG. 8(*c*) is a cross-section view of the heating member 310 seen from the Y direction, FIG. 8(*d*) is a cross-section view of the center part in the X direction of the heating member 310 illustrated in FIG. 8(*c*) seen from the X direction.

FIG. 15(*a*) is a state before cutting. FIG. 15(*b*) is a state after cutting.

FIG. 17(*a*) is a state before cutting. FIG. 17(*b*) is a state after cutting.

FIG. 22(*a*) is a state before cutting. FIG. 22(*b*) is a state after cutting.

DESCRIPTION OF THE EMBODIMENTS

Figure 1:
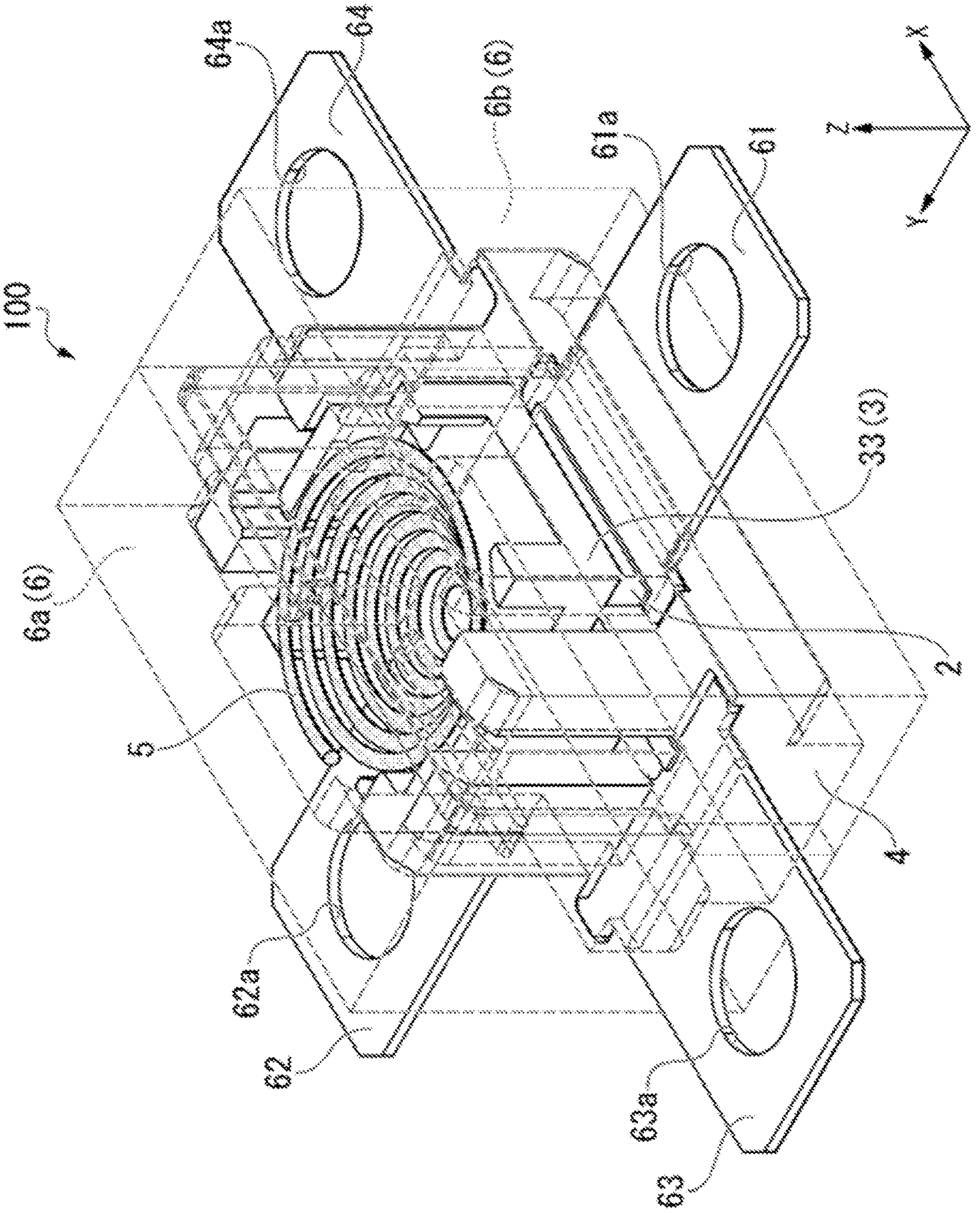
FIG. 1 is a perspective view illustrating the overall structure of the protective element 100 according to the first embodiment.

The present embodiment is described in detail below with reference to the drawings as appropriate. In the drawings used in the description below, there are cases in which characteristic portions are illustrated as enlarged for convenience in understanding the characteristics more easily, and the dimensional ratio of each constituent element and the like may actually be different. The materials, dimensions, and the like given in the description below are an example, and the present invention is not limited thereto. Appropriate changes may be implemented so long as the effect of the present invention is achieved.

First Embodiment (Protective Element)

Figure 2:
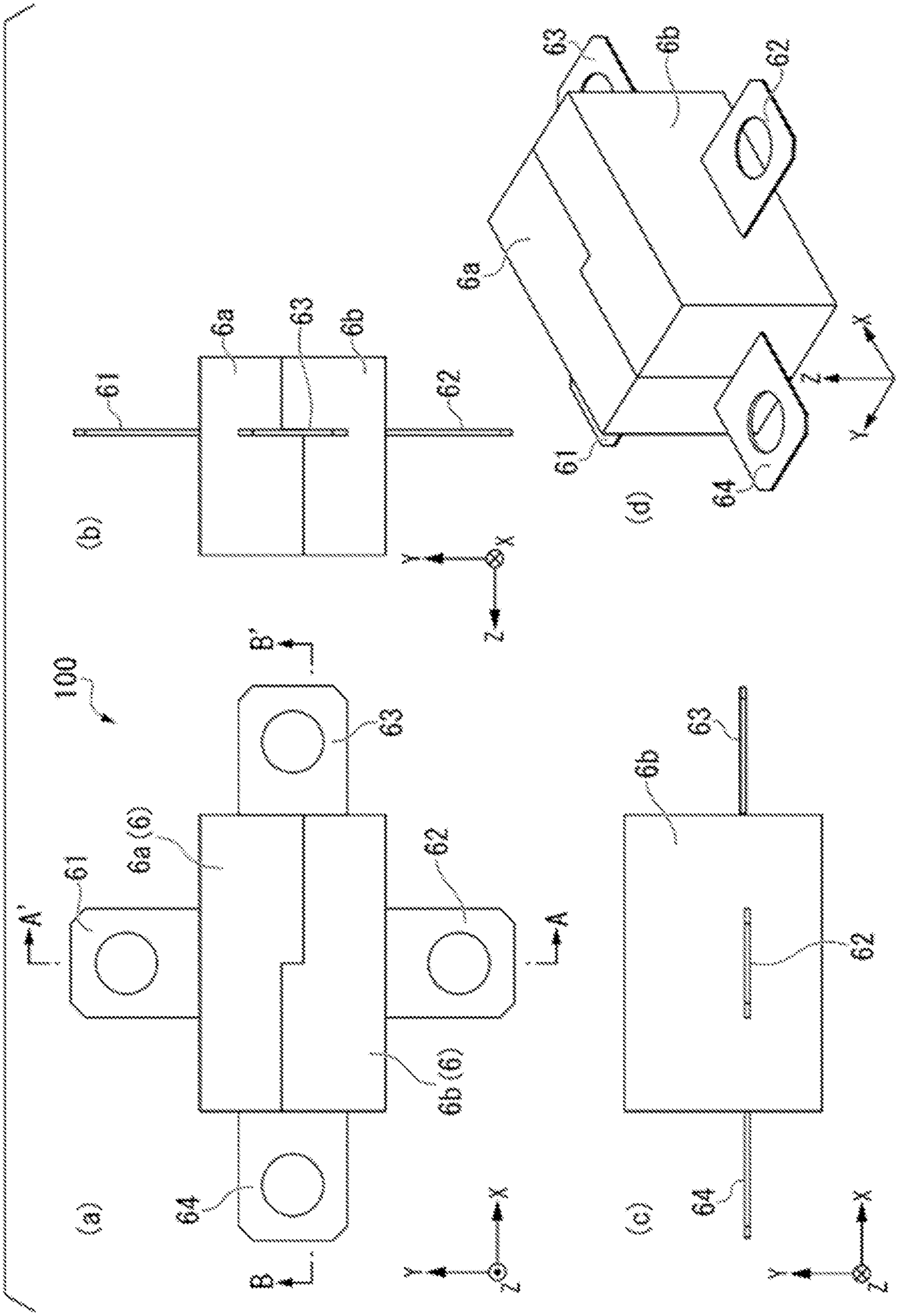
FIG. 2 is a drawing illustrating an appearance of the protective element 100 according to the first embodiment, FIG. 2(*a*) is a plan view, FIG. 2(*b*) and FIG. 2(*c*) are side surface views, and FIG. 2(*d*) is a perspective view.
Figure 3:
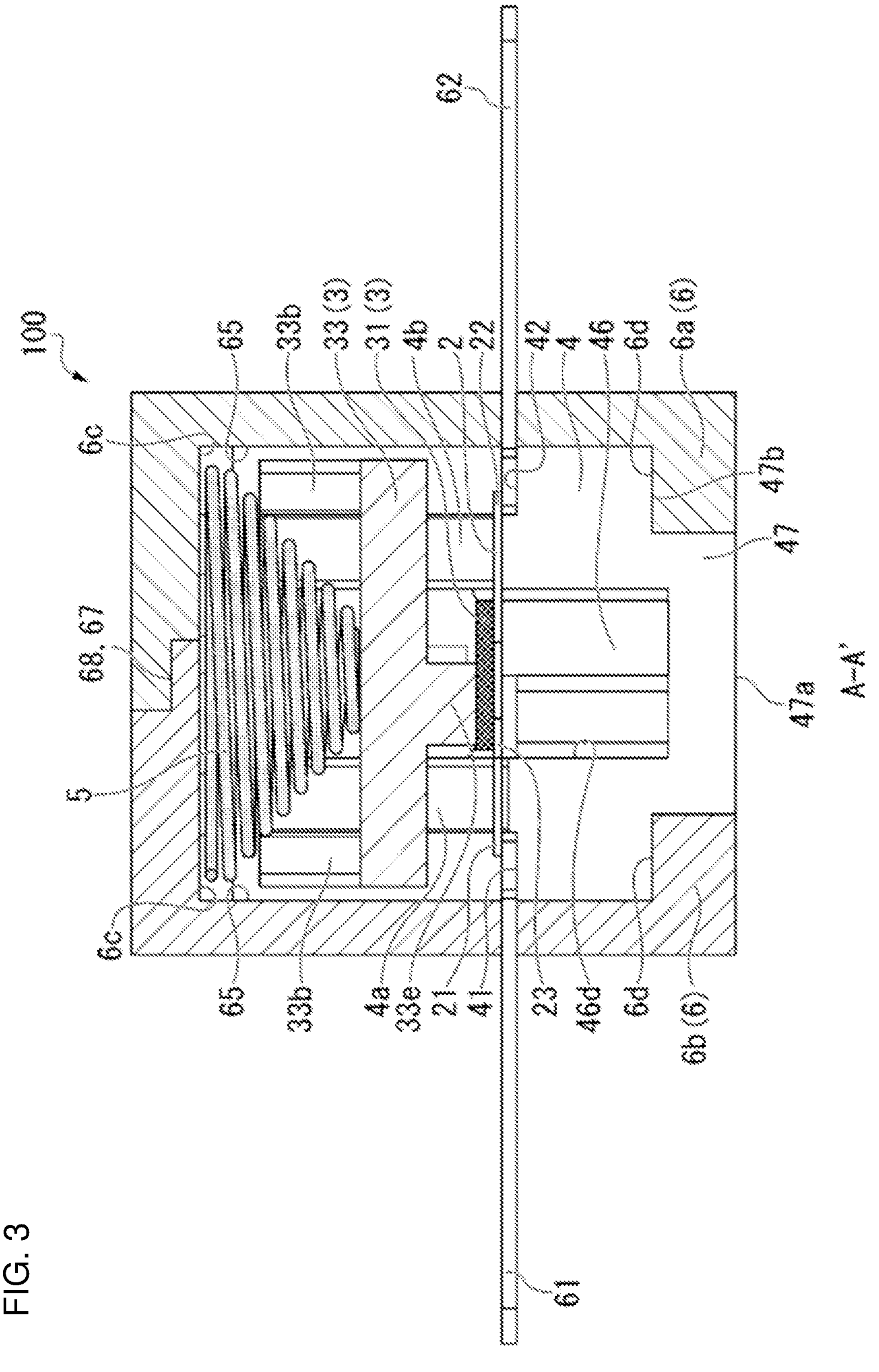
FIG. 3 is a cross-section view of the protective element 100 according to the first embodiment cut along the line A-A' illustrated in FIG. 2.

FIGS. 1 to 3 are schematic views illustrating the protective element according to the first embodiment. A protective element 100 of the first embodiment has a substantially rectangular shape in a plan view. In the drawing used in the description below, the direction indicated by X is the longitudinal direction of the protective element 100. Furthermore, in the drawing used in the description below, the direction indicated by Y is a direction (first direction) orthogonal to the X direction (second direction). The direction indicated by Z is a direction orthogonal (third direction) to the X direction and the Y direction.

Figure 4:
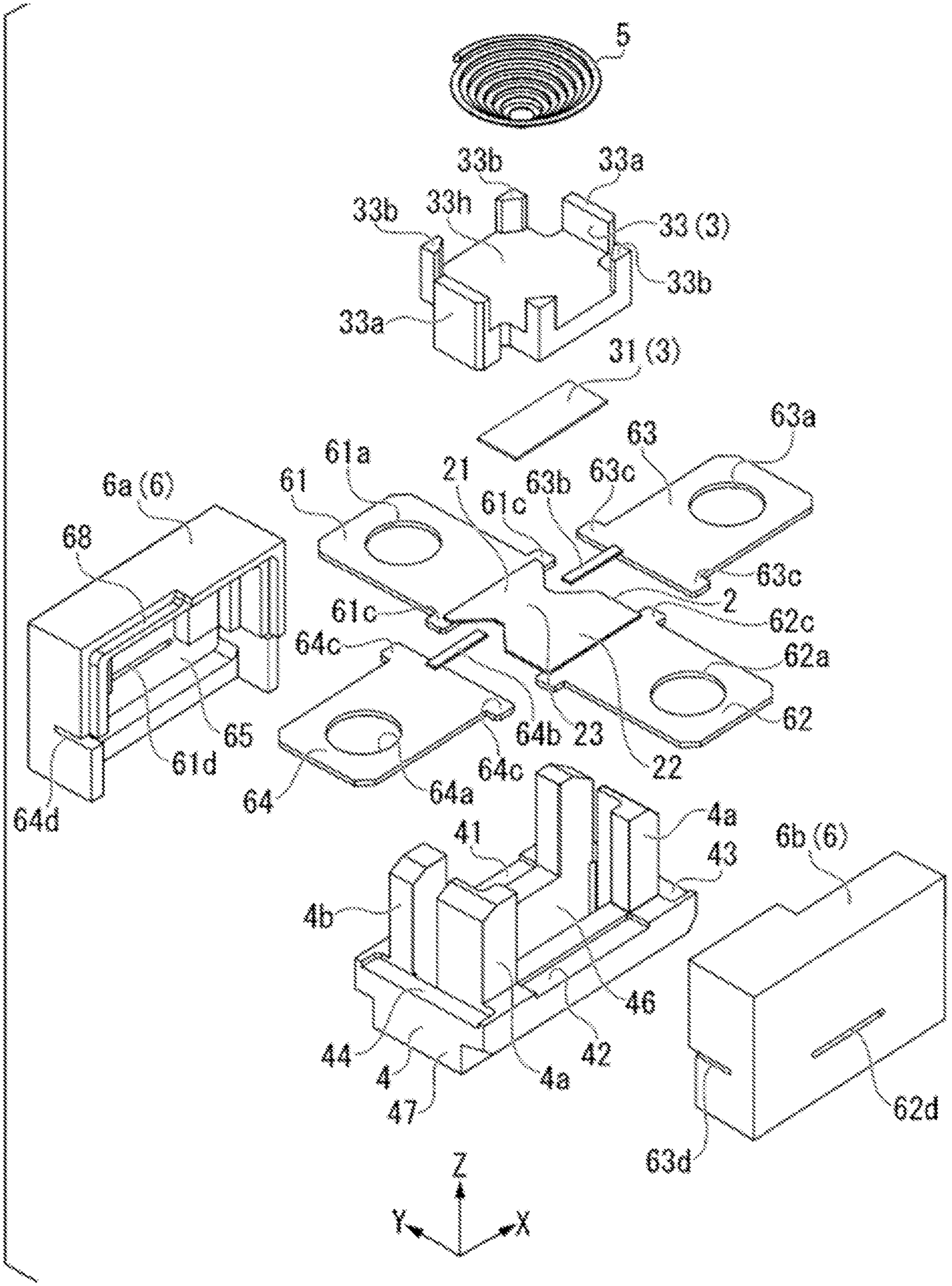
FIG. 4 is an exploded perspective view of the protective element 100 according to the first embodiment.

FIG. 1 is a perspective view illustrating a whole structure of the protective element 100 according to the first embodiment. FIG. 2 is a drawing illustrating an appearance of the protective element 100 according to the first embodiment. FIG. 2(*a*) is a plan view. FIGS. 2(*b*) and 2(*c*) are side surface views. FIG. 2(*d*) is a perspective view. FIG. 3 is a cross-section view cut along the line A-A' of the protective element 100 according to the first embodiment illustrated in FIG. 2. FIG. 4 is an exploded perspective view of the protective element 100 according to the first embodiment.

Figure 15:
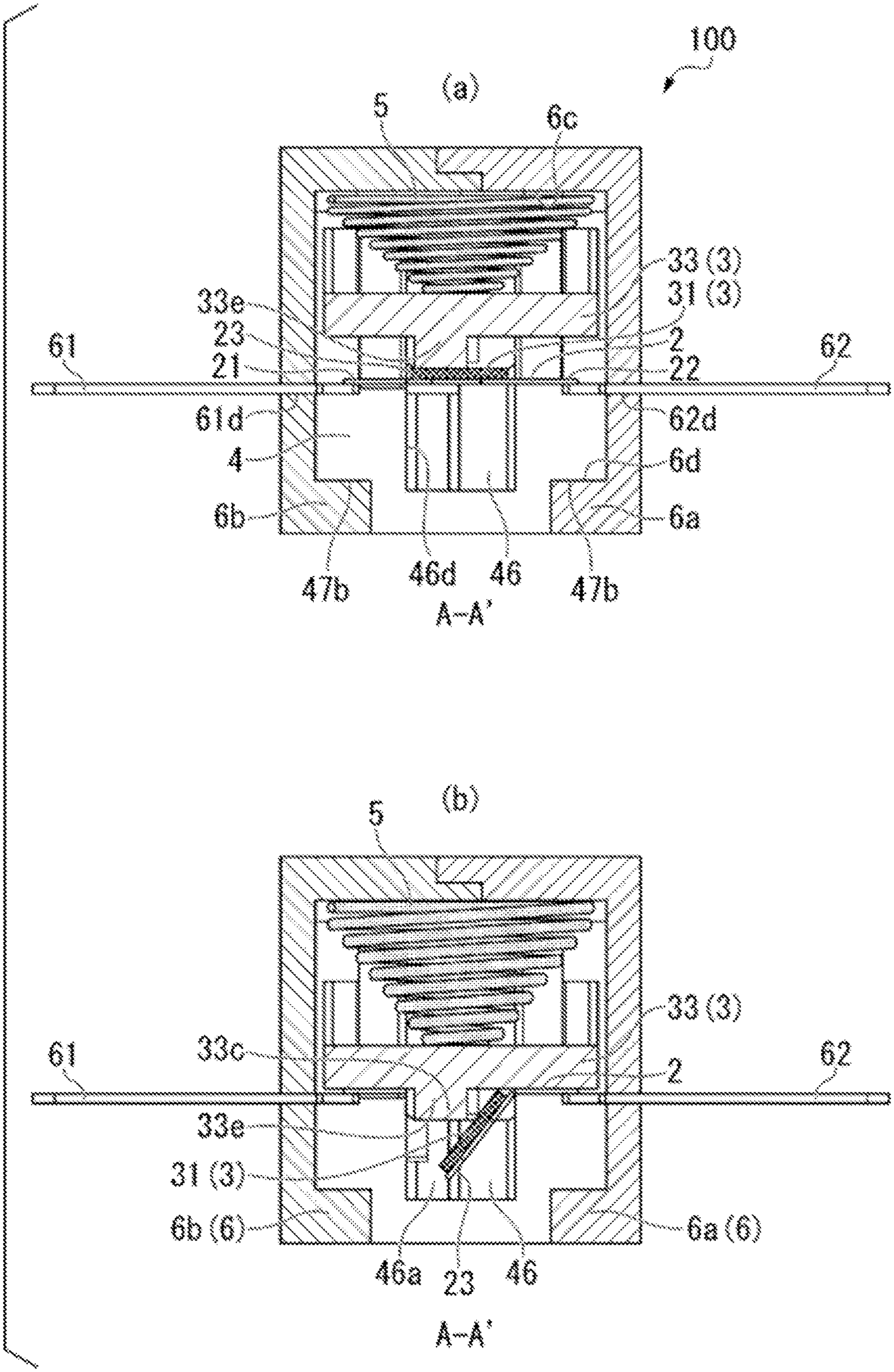
FIG. 15 is a cross-section view for describing states of the protective element 100 of the first embodiment before and after the cut part of the fuse element is cut, and is a cross-section diagram at a position cut along the line A-A' illustrated in FIG. 2.
Figure 16:
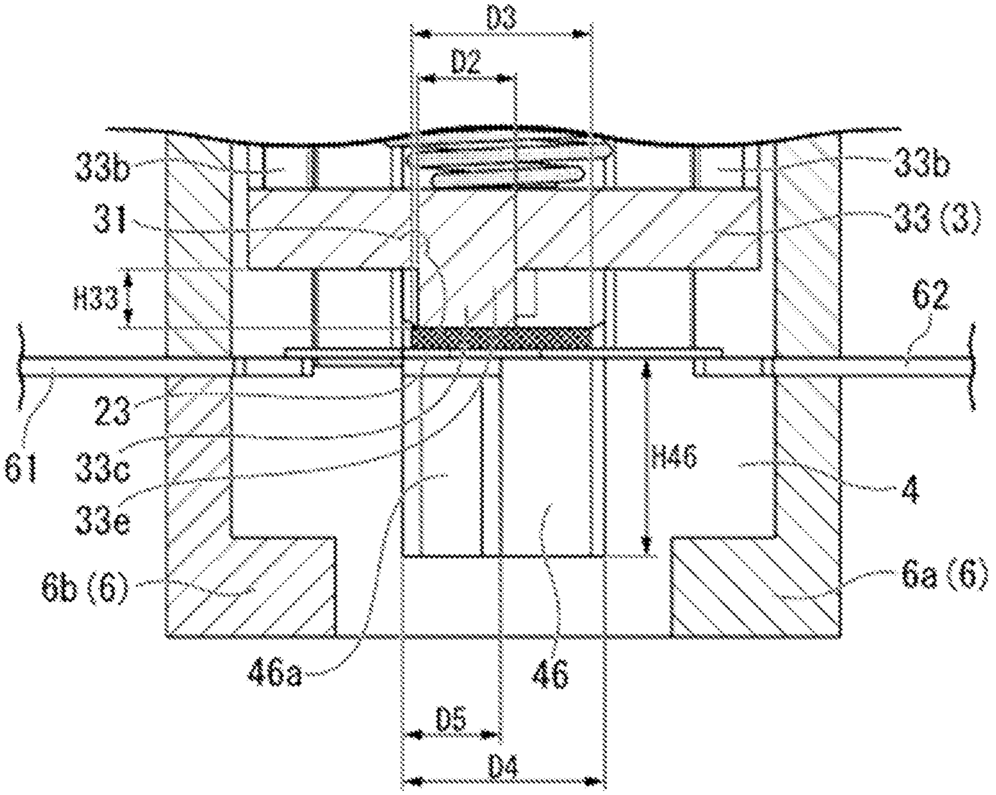
FIG. 16 is an enlarged cross-section view illustrating an enlargement of a portion of FIG. 15(*a*).
Figure 17:
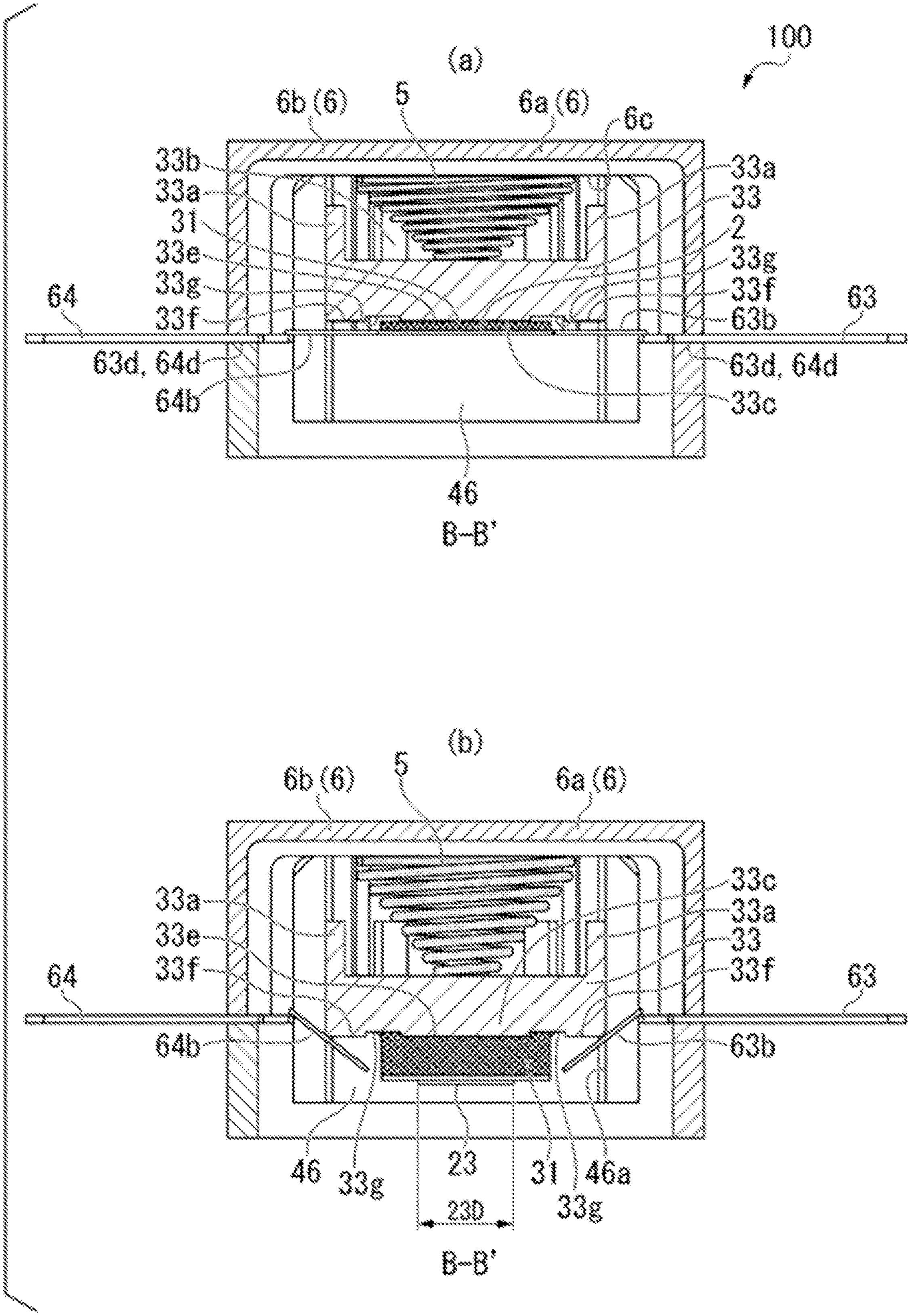
FIG. 17 is a cross-section view for describing states of the protective element 100 of the first embodiment before and after the cut part of the fuse element is cut, and is a cross-section diagram at a position cut along the line B-B' illustrated in FIG. 2.
Figure 18:
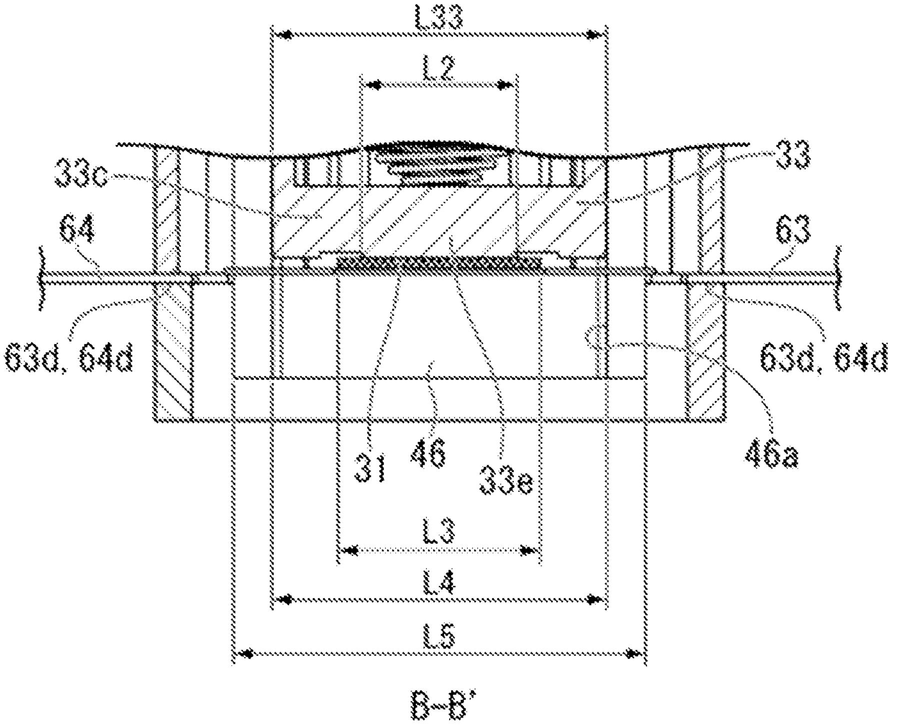
FIG. 18 is an enlarged cross-section view illustrating an enlargement of a portion of FIG. 17(*a*).

FIGS. 15 to 18 are cross-section views for describing a state of the protective element 100 of the first embodiment before and after the cut part of the fuse element is cut. FIG. 15 is a cross-section view cut along the line A-A' of the protective element 100 according to the first embodiment illustrated in FIG. 2. FIG. 16 is an enlarged cross-section view illustrating an enlargement of a portion of FIG. 15(*a*). FIG. 17 is a cross-section view cut along the line B-B' of the protective element 100 of the first embodiment illustrated in FIG. 2. FIG. 18 is an enlarged cross-section view illustrating an enlargement of a portion of FIG. 17(*a*). FIG. 15(*a*) and FIG. 17(*a*) are states before cutting. FIG. 15(*b*) and FIG. 17(*b*) are states after cutting.

As illustrated in FIGS. 3 and 4, the protective element 100 of the present embodiment is provided with a fuse element 2 having a cut part 23, a movable member 3, a concave member 4, pressing means 5, and a case 6. The protective element 100 of the present embodiment is cut by the cut part 23 of the fuse element 2 at a temperature at or above a softening temperature of the fuse element 2.

(Fuse Element)

Figure 5:
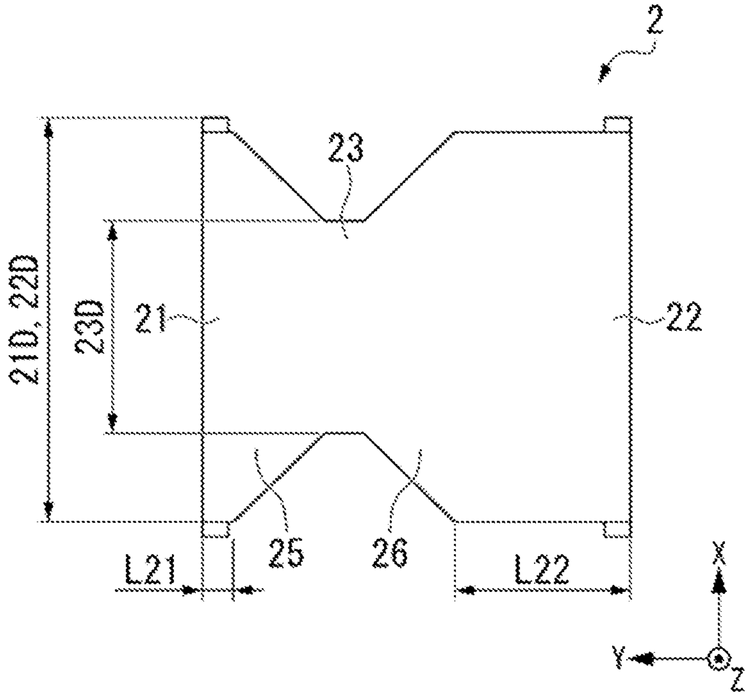
FIG. 5 is an enlarged view for describing a portion of the protective element 100 according to the first embodiment, being a plan view illustrating the fuse element 2.

FIG. 5 is an enlarged view for describing a portion of the protective element 100 according to the first embodiment, being a plan view illustrating the fuse element 2. As illustrated in FIGS. 4 and 5, the fuse element 2 has a first end 21, a second end 22, and a cut part 23 provided between the first end 21 and the second end 22. The fuse element 2 is energized in the Y direction (first direction), being the direction from the first end 21 to the second end 22.

As illustrated in FIG. 4, the first end 21 is electrically connected to a first terminal 61. The second end 22 is electrically connected to a second terminal 62.

As illustrated in FIG. 4, the first terminal 61 and the second terminal 62 may be substantially a same shape or may each have different shapes. A thickness of the first terminal 61 and the second terminal 62 is not limited, but as a guideline, may be 0.3 to 1.0 mm. The thickness of the first terminal 61 and the second terminal 62 may be the same or may be different.

As illustrated in FIG. 4, the first terminal 61 is provided with an external terminal hole 61*a*. In addition, the second terminal 62 is provided with an external terminal hole 62*a*. One from among the external terminal hole 61*a* and the external terminal hole 62*a* is used to connect to a power source side, and the other is used to connect to a load side. As illustrated in FIG. 4, the external terminal hole 61*a* and the external terminal hole 62*a* may be through holes that are substantially circular in a plan view.

The first terminal 61 and the second terminal 62 may be composed, for example, of copper, brass, or nickel. It is preferable that brass be used for the material of the first terminal 61 and the second terminal 62 from the perspective of enhancing rigidity, and it is preferable that copper be used from the perspective of reducing electrical resistance. The first terminal 61 and the second terminal 62 may be composed of a same material or may be composed of different materials.

A shape of the first terminal 61 and the second terminal 62 is not particularly limited so long as it is a shape that can engage with a terminal on the power source side (not illustrated) or a terminal on the load side, and may be, for example, a hook shape having an opening in one portion, and, as illustrated in FIG. 4, ends on the sides connected to the fuse element 2 may have flanges (indicated by the reference signs 61*c* and 62*c* in FIG. 4) that widen on both sides facing the fuse element 2. When the first terminal 61 and the second terminal 62 have the flanges 61*c* and 62*c*, the first terminal 61 and the second terminal 62 are not readily extracted from openings 61*d* and 62*d* in the case 6, making for favorable reliability and durability of the protective element 100.

As illustrated in FIGS. 3 and 4, a thickness of the fuse element 2 may be uniform or may be different in portions. For instance, thickness gradually increasing from the cut part 23 to the first end 21 and the second end 22 can be given as an example of the thickness being different in portions of the fuse element. Such a fuse element 2 is more reliably cut as the cut part 23 forms a heated spot during an overcurrent surge and the cut part 23 is heated and softened preferentially.

As illustrated in FIG. 5, the cut part 23, the first end 21, and the second end 22 of the fuse element 2 have substantially rectangular shapes in the plan view. As illustrated in FIG. 5, a width 21D in the X direction of the first end 21 and a width 22D in the X direction of the second end 22 are substantially the same. A width 23D in the X direction of the cut part 23 is narrower than the width 21D in the X direction of the first end 21 and the width 22D in the X direction of the second end 22. Therefore, the width 23D of the cut part 23 is narrower than other widths of the cut part 23.

As illustrated in FIGS. 4 and 5, a length L21 in the Y direction of the first end 21 has a length corresponding to a region overlapping the first terminal 61 in the plan view. A length L22 in the Y direction of the second end 22 extends from a region overlapping the second terminal 62 in the plan view to a side of the cut part 23. Therefore, the length of L22 in the Y direction of the second end 22 is longer than the length L21 in the Y direction of the first end 21.

As illustrated in FIG. 5, a first coupling part 25 that has a substantially trapezoidal shape in the plan view is disposed between the cut part 23 and the first end 21. The longer of parallel sides of the substantially trapezoidal shape in a plan view of the first coupling part 25 is joined to the first end 21. Further, a second coupling part 26 that has a substantially trapezoidal shape in the plan view is disposed between the cut part 23 and the second end 22. The longer of the parallel sides of the substantially trapezoidal shape in a plan view of the second coupling part 26 is joined to the second end 22. The first coupling part 25 and the second coupling part 26 are symmetrical with the cut part 23. Thus, a width of the fuse element 2 in the X direction gradually widens from the cut part 23 to the first end 21 and the second end 22. As a result, the cut part 23 is heated and softened preferentially as the cut part 23 forms a heated spot during an overcurrent surge in the fuse element 2, which is cut easily.

That is, in the present embodiment, the cut part 23, which is provided in only one location of the fuse element 2, is cut during an overcurrent surge in the fuse element 2. Therefore, in the present embodiment, the fuse element 2 is cut easily compared to, for example, when a width of the fuse element 2 in the X direction is uniform or when a plurality of cut parts are formed on the fuse element 2. Thus, in the present embodiment, low strength pressing means 5 can be used and miniaturization of the pressing means 5 and the case 6 can be devised.

As illustrated in FIGS. 4 and 5, the cut part 23 of the fuse element 2 has a width narrower in the X direction than the first end 21 and the second end 22. Thus, the cut part 23 is more easily cut than the region between the cut part 23 and the first end 21 and the region between the cut part 23 and the second end 22. The cut part 23 of the fuse element 2 may be a portion cut by the movable member 3 and the concave member 4, and is not limited to having a width narrower than the first end 21 and the second end 22.

As illustrated in FIG. 5, an overall planar shape of the fuse element 2 is substantially rectangular, and compared to a general fuse element, the width in the X direction is relatively wider and the length in the Y direction is relatively shorter. In the protective element 100 of the present embodiment, by physically cutting the fuse element 2 and distancing the cut surfaces of the cut fuse element from each other in a short period of time, arc discharge generated during cutting can be reduced and continuation of generated arc discharge can be suppressed. As such, there is no need to narrow the width of the fuse element 2 in the X direction to suppress arc discharge, which allows the width of the fuse element 2 to be widened in the X direction and the length to be shortened in the Y direction. The protection element 100, having such a fuse element 2, can suppress rises in resistance value in a current path where the protection element 100 is disposed, and can therefore be preferably installed in a high-current path.

A material used in a known fuse element may be used as the material of the fuse element 2, such as a metal material including an alloy. Specifically, alloys such as Pb 85%/Sn, Sn/Ag 3%/Cu 0.5%, and the like can be given as examples of the material of the fuse element 2.

The fuse element 2 undergoes practically no deformation when energized during normal operation. The fuse element 2 is cut at a temperature at or above a softening temperature of the material of which the fuse element 2 is composed. Because the temperature is at or above the softening temperature, cutting may be performed at the "softening temperature".

In the present specification, "softening temperature" refers to a temperature or a temperature range at which a solid phase and a liquid phase mix or coexist. The softening temperature is a temperature or a temperature zone (temperature range) at which the fuse element 2 softens to the point of deformation given an external force.

For example, when the fuse element 2 is composed of a two-component alloy, a solid phase and liquid phase mix together at a temperature range between a solidus line (temperature at which melting begins) and a liquidus line (temperature at which melting is complete), forming a sherbet-like state, so to speak. The temperature range at which this solid phase and liquid phase mix or coexist is a temperature range at which the fuse element 2 softens to the point of deformation given an external force. This temperature range is the "softening temperature".

When the fuse element 2 is composed of a three-component alloy or a multicomponent alloy, the solidus line and the liquid phase line described above are to be read instead as solidus surface and liquidus surface, and similarly, a temperature range at which the solid phase and the liquid phase mix or coexist is the "softening temperature".

There are temperature differences between the solidus line and the liquidus line when the fuse element 2 is composed of an alloy, therefore the "softening temperature" is a temperature range.

When the fuse element 2 is composed of a single metal, no solidus line/liquidus line exists and there is only one melting point/solidification point. When the fuse element 2 is composed of a single metal, the solid phase and the liquid phase form a state where they mix or coexist at a melting point or a solidification point, therefore the melting point or the solidification point is the "softening temperature" in the present embodiment.

Measurement of the solidus line and the liquidus line can be performed as a point of discontinuity (temperature plateau over time) due to latent heat that accompanies a phase state change in a temperature increasing process. An alloy material and a single metal having a temperature or a temperature range at which a solidus phase and a liquid phase mix or coexist both may be used as the material of the fuse element 2 of the present embodiment.

As illustrated in FIGS. 4 and 5, the fuse element 2 may be composed of one member (part) and may be composed of a plurality of members (parts) of different materials. When the fuse element 2 is formed of a plurality of members of different materials, a form of each material may be determined by a usage, material, or the like of the fuse element 2, and is not particularly limited.

An example can be given where a fuse element 2 formed of a plurality of members of different materials is formed of a plurality of members composed of materials having different softening temperatures. When formed of a plurality of members of different materials having softening temperatures, the fuse element 2 takes on a state in which the solid phase and the liquid phase mix in order from a material having a lowest softening temperature and is cut at or above a softening temperature of the material having the lowest softening temperature.

The fuse element 2 formed of a plurality of members of different materials can take on various structures.

For example, the fuse element may be a structure having a cross-sectional form in which an outer surface of an inner layer is coated by an outer layer, or an inner layer and an outer layer may be composed of materials having different softening temperatures. The cross-sectional form in this case may be rectangular or circular, and is not particularly limited. Moreover, in this case, it is preferable that the inner layer be composed of a metal having a low melting point and that the outer layer be composed of a metal having a high melting point.

Also, the fuse element 2 may be a laminated body in which a layer-like member composed of materials having different softening temperatures are laminated in a plurality in the thickness direction. In this case, a number of laminations of the layer-like member composed of materials having different softening temperatures may be two layers, three layers, four layers, or more.

Since in such a fuse element 2, the laminated body contains a layer composed of a material having a high softening temperature, rigidity is ensured. In addition, due to containing a layer composed of a material having a low softening temperature, the laminated body softens and can easily be cut at the low temperature. That is, when the fuse element 2 is the laminated body described above, a mixing state of the solid phase and the liquid phase is in order from the layer of the material having the low softening temperature. As a result, the fuse element 2 can be cut even when the entire laminated body does not reach the softening temperature.

Specifically, the fuse element 2 may be a laminated body having a three-layer structure where an inner layer and outer layers interposing the inner layer are laminated in the thickness direction, and the inner layer and the outer layers may be composed of materials having different softening temperatures. In such a fuse element 2, among the inner layer and the outer layers of the laminated body, a mixing state of the solid phase and the liquid phase begin first in the layer of the material having the low softening temperature. A layer of a material having a high melting temperature can be cut before the softening temperature is reached. For a laminated body having a three-layer structure, it is preferable that the inner layer be composed of a metal having a low melting point and that the outer layer be composed of a metal having a high melting point.

It is preferable that Sn or a metal in which Sn is the primary component be used as the metal having a low melting point, which is used as a material of the fuse element 2. Because the melting point of Sn is 232° C., a metal in which Sn is the primary component has a low melting point and softens at a low temperature. For example, the solidus line of the alloy Sn/Ag 3%/Cu 0.5% is 217° C.

It is preferable that Ag, Cu, or a metal in which Ag or Cu is the primary component be used as the metal having a high melting point, being used as a material of the fuse element 2. Because, for example, the melting point of Ag is 962° C., rigidity of the layer composed of the metal in which Ag is the primary component is maintained at a temperature at which the layer composed of the metal having the low melting point softens.

The fuse element 2 can be manufactured by a known method. When, for example, the fuse element 2 is a laminated body having a three-layer structure where the inner layer is composed of a metal having a low melting point and the outer layers are composed of a metal having a high melting point, such can be manufactured according to the method given below. First, a metal foil composed of a metal having a low melting point is prepared. Next, a metal layer having a high melting point is formed on an entire surface of the metal foil using a plating method to obtain a laminate. Thereafter, the laminate is cut into a prescribed shape. The fuse element 2 composed of the laminated body having a three-layer structure can be obtained by the above steps.

(Movable Member)

As illustrated in FIGS. 3 and 4, in the protective element 100 of the present embodiment, the movable member 3 and the concave member 4 are disposed facing each other such that the cut part 23 of the fuse element 2 is interposed therebetween.

In the present embodiment, interposing the cut part 23 of the fuse element 2 between the movable member 3 and the concave member 4 means interposing the fuse element 2 vertically between the movable member 3 and the concave member 4 and overlapping the cut part 23 with the movable member 3 and the concave member 4 in a plan view in the Z direction. The movable member 3 and the concave member 4 may or may not be in contact with the cut part 23.

The movable member 3 cuts the fuse element 2 through a pressing force of the pressing means 5. The movable member 3 may be composed of a single member or may be composed of a plurality of members (see FIG. 3).

As illustrated in FIGS. 3 and 4, the protective element 100 of the present embodiment has a convex member 33 and a heating member 31, being a non-convex member, as the movable member 3. The movable member 3 may be just the convex member 33 and may be just the non-convex member. It is preferable that the movable member 3 have both the convex member 33 and the non-convex member. In the present embodiment, the convex member 33 is provided between the pressing means 5 and the cut part 23. By being disposed in contact with the cutting part 23, the non-convex member (heating member 31) is provided between the convex member 33 and the cut part 23.

<Non-Convex Member>

The non-convex member used as the movable member 3 is a member having no convex portion on the fuse element 2 side and is, for example, a plate-like member. The non-convex member may be a heating member. In the present embodiment, an example of a case is given in which the heating member 31 is provided as the non-convex member.

In the protective element 100 of the present embodiment, the heating member 31 is disposed on the pressing means 5 side of the fuse element 2 in contact with the cut part 23. The heating member 31 may be disposed near the cut part 23 without being disposed in contact with the cut part 23. When disposed near the cut part 23, a case in which a distance between the heating member 31 and the cut part 23 is 1 mm or less can be given as an example.

Figure 6:
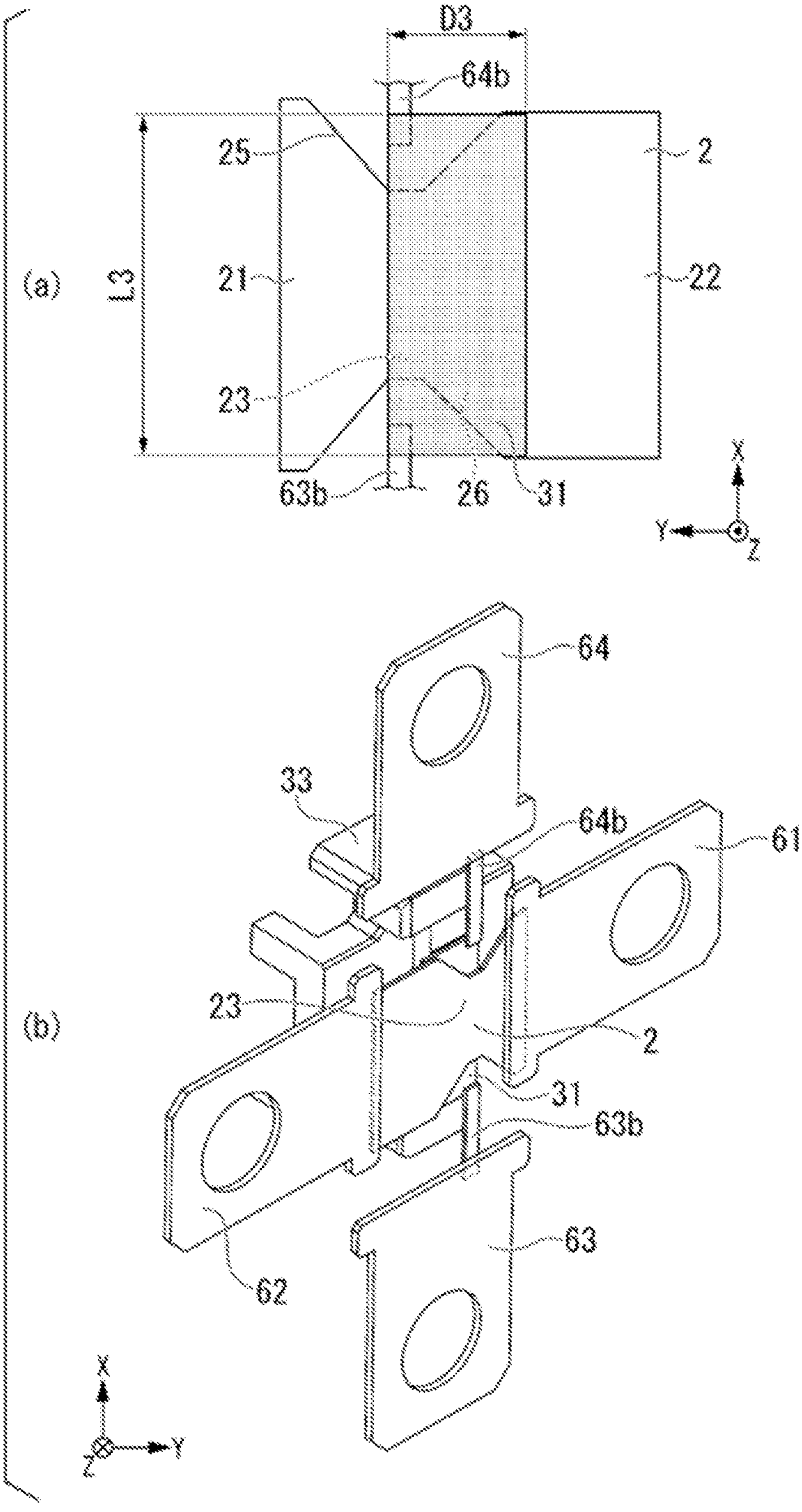
FIG. 6 is a drawing for describing a relationship between disposal of the fuse element 2 and the heating member 31 in the protective element 100 of the first embodiment, FIG. 6(*a*) is a plan view seen from the pressing means 5 side, and FIG. 6(*b*) is a perspective view seen from the concave member 4 side.
Figure 7:
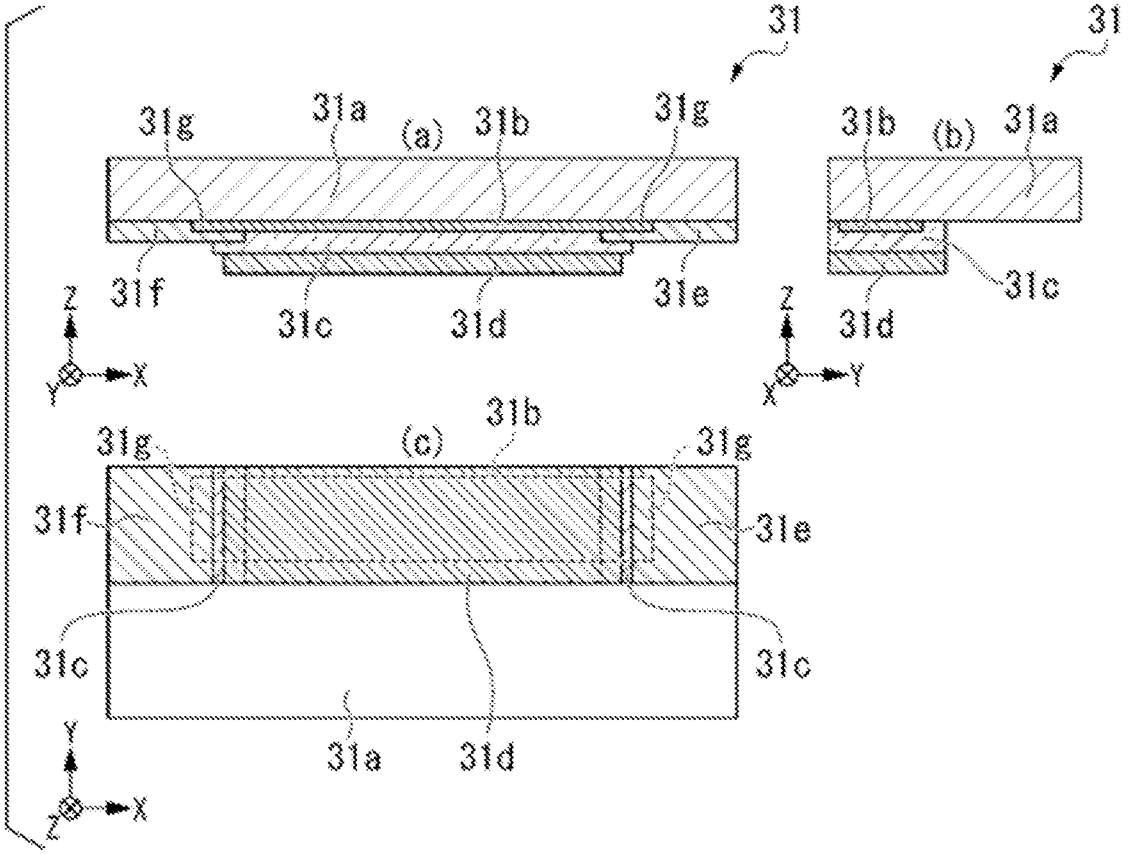
FIG. 7 is a drawing for describing a structure of the heating member 31 provided to the protective element 100 according to the first embodiment, FIG. 7(*a*) is a cross-section view seen from the Y direction, FIG. 7(*b*) is a cross-section view seen from the X direction of a center part in the X direction, and FIG. 7(*c*) is a plan view.

FIG. 6 is a drawing for describing a relationship between disposal of the fuse element 2 and the heating member 31 in the protective element 100 of the first embodiment. FIG. 6(*a*) is a plan view seen from the pressing means 5 side. FIG. 6(*b*) is a perspective view seen from the concave member 4 side. FIG. 7 is a drawing for describing a structure of the heating member 31 provided to the protective element 100 of the first embodiment. FIG. 7(*a*) is a cross-section view in the Y direction. FIG. 7(*b*) is a cross-section view in the X direction. FIG. 7(*c*) is a plan view.

As illustrated in FIG. 7(*a*) to FIG. 7(*c*), the heating member 31 is a plate-like member. The heating member 31 has an insulated substrate 31*a*, a heating part 31*b*, an insulating layer 31*c*, an element connecting electrode 31*d*, and electrical supply line electrodes 31*e* and 31*f*. The heating member 31 has a function for heating and softening the cut part 23 of the fuse element 2 and a function of applying the pressing force of the pressing means 5 as a load to the cut part 23. The heating member 31 is the movable member 3.

As illustrated in FIG. 7(*a*) to FIG. 7(*c*), the insulated substrate 31*a* has a substantially rectangular shape in a plan view in the X direction that extends in the direction of the long side.

A substrate having known insulating properties can be used as the insulated substrate 31*a*, and alumina, glass ceramics, mullite, zirconia, and the like can be given as examples.

As illustrated in FIG. 7(*a*) to FIG. 7(*c*), the heating part 31*b* is formed on a second surface (lower surface in FIG. 7(*a*) to FIG. 7(*c*)) of the insulated substrate 31*a*. As illustrated in FIG. 7(*c*), the heating part 31*b* is provided in a belt shape extending in the X direction along one long edge of the insulated substrate 31*a*, which is substantially rectangular in a plan view.

The heating part 31*b* is preferably a resistor composed of a conductive material that generates heat by being energized through electrical supply lines 63*b* and 64*b* (see FIG. 4). A material containing a metal such as Nichrome, W, Mo, Ru, or the like can be given as examples of the material of the heating part 31*b*.

As illustrated in FIGS. 7(*a*) to 7(*c*), electrical supply line electrodes 31*e* and 31*f* are provided on an end of the insulated substrate 31*a* in the X direction, and a portion is provided at a position that respectively overlaps two ends 31*g* and 31*g* of the heating part 31*b* in a planar view. The electrical supply line electrodes 31*e* and 31*f* can be formed of a known electrode material. The electrical supply line electrodes 31*e* and 31*f* are electrically connected to the heating part 31*b*.

The electrical supply line electrodes 31*e* and 31*f* are for energizing the heating part 31*b* via a current control element provided in an external circuit when an abnormality occurs in the external circuit, which is an energizing path of the protective element 100, and it becomes necessary to cut off the energizing path, for example, when a current exceeding a rated current flow through the fuse element 2.

As illustrated in FIG. 7(*a*) to FIG. 7(*c*), the insulating layer 31*c* is provided on the surface of the insulated substrate 31*a* on the side where the heating part 31*b* is formed. The insulating layer 31*c* is provided at a center part of the insulated substrate 31*a* in the X direction so as to cover the heating part 31*b* and a part connecting the heating part 31*b* and the electrical supply line electrodes 31*e* and 31*f*, which is exposed above the insulating layer 31*c*. The insulating layer 31*c* is not provided at an end of the insulated substrate 31*a* in the X direction. As such, a portion of the electrical supply line electrodes 31*e* and 31*f* is exposed, not being covered by the insulating layer 31*c*.

The insulating layer 31*c* protects the heating part 31*b*, efficiently transmits heat generated by the heating part 31*b* to the fuse element 2, and is devised to insulate the heating part 31*b* and the element connecting electrode 31*d*. The insulating layer 31*c* can be formed of a known insulating material such as glass.

As illustrated in FIG. 7(*a*) to FIG. 7(*c*), the element connecting electrode 31*d* is provided at a position overlapping the heating part 31*b* on the insulating layer 31*c* in a plan view. The element connecting electrode 31*d* can be formed of a known electrode material. The element connecting electrode 31*d* is connected to the fuse element 2.

The heating member 31 illustrated in FIG. 7(*a*) to FIG. 7(*c*) is provided with the heating part 31*b*, the insulating layer 31*c*, the element connecting electrode 31*d*, and the electrical supply line electrodes 31*e* and 31*f* along one long edge of the insulated substrate 31*a*, which has a substantially rectangular shape in a plan view, however, these may be provided along both long edges of the insulated substrate 31*a*. In this case, for example, when electrically connecting the heating member 31 and the electrical supply lines 63*b* and 64*b* (see FIG. 4), mistaking the end at which the electrical supply line electrodes 31*e* and 31*f* are not provided for the electrical supply line electrodes 31*e* and 31*f* can be prevented.

The heating member 31 illustrated in FIG. 7(*a*) to FIG. 7(*c*) is disposed such that the surface on the element connecting electrode 31*d* side faces the fuse element 2. Therefore, the insulated substrate 31*a* is not disposed between the heating part 31*b* and the fuse element 2. Thus, heat generated by the heating part 31*b* is transmitted to the fuse element 2 more efficiently than when the insulated substrate 31*a* is disposed between the heating part 31*b* and the fuse element 2.

The heating member 31 illustrated in FIG. 7(*a*) to FIG. 7(*c*) can be manufactured according to the following method given below. First, the insulated substrate 31*a* is prepared. A paste-like composition containing a material forming the heating part 31*b* and a resin binder is prepared. Then, the composition described above is screen-printed onto a second surface of the insulated substrate 31*a* (lower surface in FIG. 7(*a*) to FIG. 7(*c*)) to form a prescribed pattern, and fired. Thereby, the heating part 31*b* is formed.

Next, the electrical supply line electrodes 31*e* and 31*f* are formed by a known method and electrically connected to the two ends 31*g* and 31*g* of the heating part 31*b* respectively. Next, the insulating layer 31*c* is formed by a known method, the heating part 31*b* is covered by the insulating layer 31*c*, and the part connecting the heating part 31*b* and the electrical supply line electrodes 31*e* and 31*f* is covered as well.

Thereafter, the element connecting electrode 31*d* is formed on the insulating layer 31*c* by a known method.

The heating member 31 illustrated in FIG. 7(*a*) to FIG. 7(*c*) can be obtained by the above steps.

Figure 8:
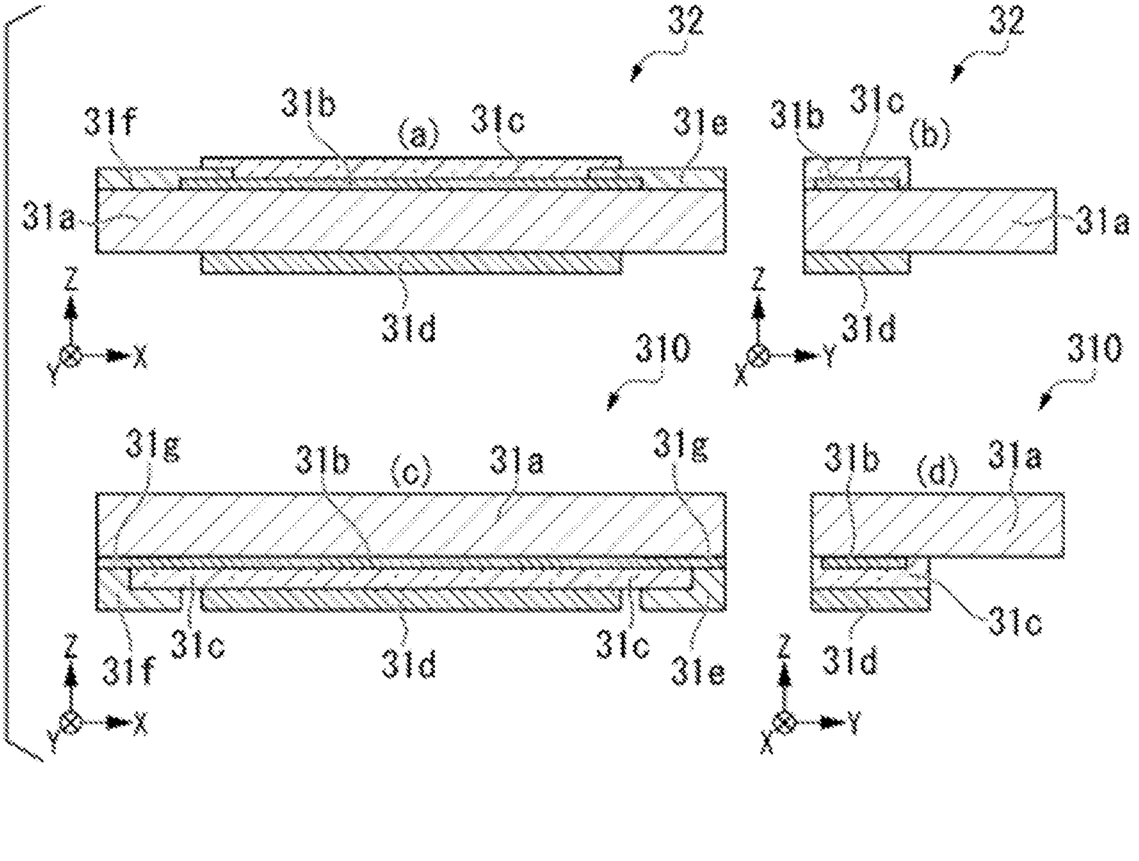
FIG. 8 is a drawing for describing another example of the heating member, FIG. 8(*a*) is a cross-section view of the heating member 32 seen from the Y direction, and FIG. 8(*b*) is a cross-section view seen from the X direction of the center part in the X direction of the heating member 32 illustrated in FIG. 8(*a*).

FIG. 8 is a drawing for describing another example of the heating member. FIG. 8(*a*) is a cross-section view of the heating member 32 seen from the Y direction. FIG. 8(*b*) is a cross-section view of the center part of the heating member 32 illustrated in FIG. 8(*a*) seen from the X direction. FIG. 8(*c*) is a cross-section view of a heating member 310 seen from the Y direction. FIG. 8(*d*) is a cross-section view of the center part of the heating member 310 illustrated in FIG. 8(*c*) seen from the X direction.

The protective element 100 of the present embodiment may be provided with the heating member 32 illustrated in FIG. 8(*a*) and FIG. 8(*b*) instead of the heating member 31 illustrated in FIG. 7(*a*) to FIG. 7(*c*).

In the heating member 32 illustrated in FIG. 8(*a*) and FIG. 8(*b*), members identical to those in the heating member 31 illustrated in FIG. 7(*a*) to FIG. 7(*c*) are given the same reference signs, and descriptions thereof are omitted. A planar arrangement of each member in the heating member 32 illustrated in FIG. 8(*a*) and FIG. 8(*b*) is the same as the planar arrangement for each member of the heating member 31 illustrated in FIG. 7(*a*) to FIG. 7(*c*).

The heating member 32 illustrated in FIG. 8(*a*) and FIG. 8(*b*) is a plate-like member. Similar to the heating member 31 illustrated in FIG. 7(*a*) to FIG. 7(*c*), the heating member 32 has an insulated substrate 31*a*, a heating part 31*b*, an insulating layer 31*c*, an element connecting electrode 31*d*, and electrical supply line electrodes 31*e* and 31*f*.

As illustrated in FIG. 8(*a*) and FIG. 8(*b*), the heating part 31*b* is formed on a first surface (lower surface in FIG. 8(*a*) and FIG. 8(*b*)) of the insulated substrate 31*a*.

As illustrated in FIG. 8(*a*) and FIG. 8(*b*), electrical supply line electrodes 31*e* and 31*f* are provided at a position such that a portion thereof respectively overlaps both ends of the heating part 31*b* in a planar view. The insulating layer 31*c* is provided on the surface of the insulated substrate 31*a* on the side where the heating part 31*b* is formed. The insulating layer 31*c* is provided at a center part of the insulated substrate 31*a* in the X direction so as to cover the heating part 31*b* and a part connecting the heating part 31*b* and the electrical supply line electrodes 31*e* and 31*f*, which is exposed above the insulating layer 31*c*. The insulating layer 31*c* is not provided at an end of the insulated substrate 31*a* in the X direction. As such, a portion of the electrical supply line electrodes 31*e* and 31*f* is exposed, not being covered by the insulating layer 31*c*. The insulating layer 31*c* protects the heating part 31*b* and efficiently transmits heat generated by the heating part 31*b* to the fuse element 2.

As illustrated in FIG. 8(*a*) and FIG. 8(*b*), the element connecting electrode 31*d* of the heating member 32 is different than the heating member 31 illustrated in FIG. 7(*a*) to FIG. 7(*c*), and is formed on the second surface (lower surface in FIG. 8(*a*) and FIG. 8(*b*)), which is the surface of the side opposite the side provided by the heating part 31*b* of the insulated substrate 31*a*. The element connecting electrode 31*d* is disposed facing the insulating layer 31*c* through the insulated substrate 31*a*. Like the heating member 31 illustrated in FIG. 7(*a*) to FIG. 7(*c*), the element connecting electrode 31*d* is connected to the fuse element 2.

The protective element 100 of the present embodiment may be provided with the heating member 310 illustrated in FIG. 8(*c*) and FIG. 8(*d*) instead of the heating member 31 illustrated in FIG. 7(*a*) to FIG. 7(*c*).

In the heating member 310 illustrated in FIG. 8(*c*) and FIG. 8(*d*), members identical to those in the heating member 31 illustrated in FIG. 7(*a*) to FIG. 7(*c*) are given the same reference signs, and descriptions thereof are omitted. An arrangement of each member of the center part in the X direction of the heating member 310 illustrated in FIG. 8(*c*) and FIG. 8(*d*) in a cross-section seen from the X direction is the same as the arrangement of each member of the heating member 31 illustrated in FIG. 7(*a*) to FIG. 7(*c*).

The heating member 310 illustrated in FIG. 8(*c*) and FIG. 8(*d*) is a plate-like member. Like the heating member 31 illustrated in FIG. 7(*a*) to FIG. 7(*c*), the heating member 310 has an insulated substrate 31*a*, a heating part 31*b*, an insulating layer 31*c*, an element connecting electrode 31*d*, and electrical supply line electrodes 31*e* and 31*f*.

As illustrated in FIG. 8(*c*), the heating part 31*b* is formed on a second surface (lower surface in FIG. 8(*c*)) of the insulated substrate 31*a*. As illustrated in FIG. 8(*c*), the heating part 31*b* is provided in a belt shape extending in the X direction from one end of the insulated substrate 31*a*, which is substantially rectangular in a plan view, to the other along one long edge thereof.

As illustrated in FIG. 8(*c*), the insulating layer 31*c* is provided on the heating part 31*b*. The insulating layer 31*c* is provided at a center part of the insulated substrate 31*a* in the X direction such that a region of the heating part 31*b*, except for the two ends 31*g* and 31*g*, is covered. Therefore, the two ends 31*g* and 31*g* of the heating part 31*b* are exposed, not being covered by the insulating layer 31*c*.

As illustrated in FIG. 8(*c*), the electrical supply line electrodes 31*e* and 31*f* are provided at an end of the insulated substrate 31*a* in the X direction. The electrical supply line electrodes 31*e* and 31*f* respectively overlap the two ends 31*g* and 31*g* of the heating part 31*b* in a plan view. Thereby, the electrical supply line electrodes 31*e* and 31*f* are electrically connected to the heating part 31*b*.

As illustrated in FIG. 8(*c*), the element connecting electrode 31*d* is provided on the insulating layer 31*c* except for the region in which the electrical supply line electrodes 31*e* and 31*f* are provided. As illustrated in FIG. 8(*c*), the element connecting electrode 31*d* is disposed separated from the electrical supply line electrodes 31*e* and 31*f*. The element connecting electrode 31*d* is provided at a position overlapping the heating part 31*b* on the insulating layer 31*c* in a plan view.

As illustrated in FIG. 3, the heating member 31 is disposed contacting the fuse element 2 on the cut part 23 (upper surface in FIG. 3). As illustrated in FIG. 6(*a*) and FIG. 6(*b*), the heating member 31 is disposed overlapping the cut part 23 of the fuse element 2, the second coupling part 26, and a portion of the second end 22 on the second coupling part 26 side. Furthermore, in the present embodiment, as illustrated in FIG. 7(*a*), the heating part 31*b* of the heating member 31 is provided along one long edge of the insulated substrate 31*a*, which is substantially rectangular in a plan view. Thus, the heating part 31*b* of the heating member 31 is disposed overlapping the cut part 23 of the fuse element 2 in the plan view. Therefore, in the protective element 100 of the present embodiment, the cut part 23 is efficiently heated by the heating member 31.

As illustrated in FIG. 4 and FIGS. 6(*a*) and (*b*), the electrical supply line electrodes 31*e* and 31*f* of the heating member 31 (see FIG. 7(*a*) to FIG. 7(*c*)) are electrically connected to a third terminal 63 and a fourth terminal 64 by the electrical supply lines 63*b* and 64*b* respectively. In the present embodiment, an example can be described of a case in which the heating member 31, the third terminal 63, and the fourth terminal 64 are electrically connected through an electrical supply member composed of the electrical supply lines 63*b* and 64*b*. A form of the electrical supply member is not limited to a linear shape such as that of the electrical supply lines 63*b* and 64*b*, so long as the electrical supply member can electrically connect the heating member 31 to the third terminal 63 and the fourth terminal 64.

As illustrated in FIG. 4, the third terminal 63 is provided with an external terminal hole 63*a*. In addition, the fourth terminal 64 is provided with an external terminal hole 64*a*. As illustrated in FIG. 4, the external terminal hole 63*a* and the external terminal hole 64*a* may be through holes that are substantially circular in a plan view.

A shape of the third terminal 63 and the fourth terminal 64 is not particularly limited so long as it is a shape that can engage with an external terminal (not illustrated), and may be, for example, a hook shape having an opening in one portion, or, as illustrated in FIG. 4, at ends on the sides connected to the electrical supply lines 63*b* and 64*b*, may have flanges (indicated by the reference signs 63*c* and 64*c* in FIG. 4) that widen on both sides facing the electrical supply lines 63*b* and 64*b*. When the third terminal 63 and the fourth terminal 64 have the flanges 63*c* and 64*c*, the third terminal 63 and the fourth terminal 64 are not readily extracted from slits 63*d* and 64*d* in the case 6, making for favorable reliability and durability of the protective element 100.

As illustrated in FIG. 4, the third terminal 63 and the fourth terminal 64 may be substantially a same shape or may each have different shapes. The same examples given for the first terminal 61 and the second terminal 62 can be given for the materials used in the third terminal 63 and the fourth terminal 64.

As illustrated in FIG. 4, in the present embodiment, a substantially same form composed of the same materials can be used for the third terminal 63, the fourth terminal 64, the first terminal 61, and the second terminal 62.

<Convex Member>

Figure 9:
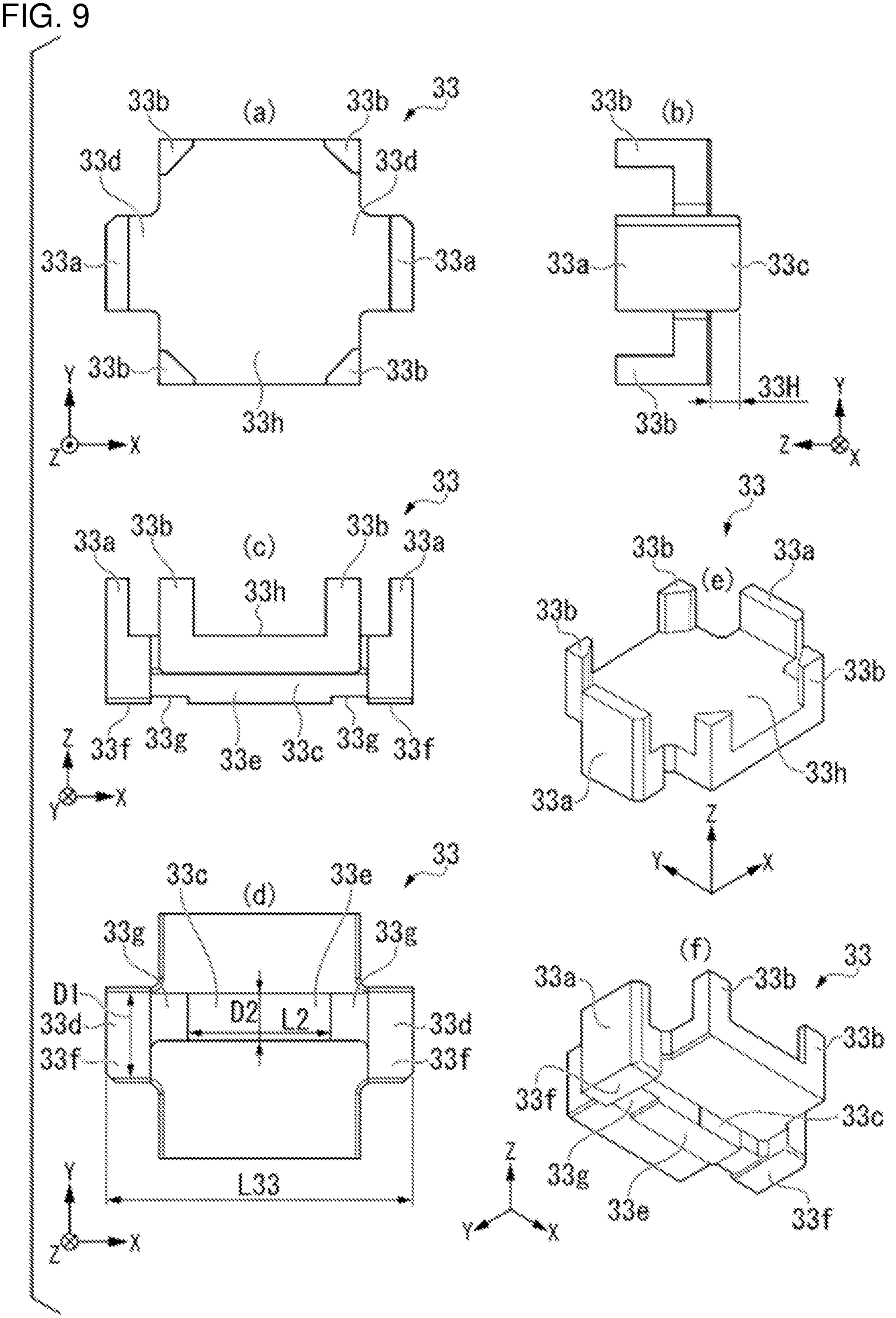
FIG. 9 is a drawing for describing a structure of the convex member 33 provided to the protective element 100 according to the first embodiment, FIG. 9(*a*) is a view seen from the first surface, FIG. 9(*b*) is a side surface view seen from the X direction, FIG. 9(*c*) is a side surface view seen from the Y direction, FIG. 9(*d*) is a view seen from the second surface, and FIG. 9(*e*) and FIG. 9(*f*) are perspective views.

FIG. 9 is a drawing for describing a structure of the convex member 33 provided to the protective element 100 of the first embodiment. FIG. 9(*a*) is a view seen from the first surface. FIG. 9(*b*) is a side surface view seen from the X direction. FIG. 9(*c*) is a side surface view seen from the Y direction. FIG. 9(*d*) is a view seen from the second surface. FIGS. 9(*e*) and (*f*) are perspective views.

As illustrated in FIG. 3, the convex member 33 is a member having a convex portion on the fuse element 2 side. The convex member 33 is a movable member having a function of applying the pressing force of the pressing means 5 to the cut part 23 of the fuse element 2 as a load.

As illustrated in FIG. 9(*a*) and FIG. 9(*d*), the convex member 33 has a substantially rectangular shape in the plan view. Two sides of the convex member 33 opposing each other in a plan view are provided with convex regions 33*d* and 33*d*, which respectively extend outward (X direction).

As illustrated in FIG. 9(*a*) to FIG. 9(*c*) and FIG. 9(*e*), first guide members 33*a* and second guide members 33*b* are positioned on the first surface (upper surface) side of the convex member 33. Heights of the first guide members 33*a* and the second guide members 33*b* (length from the upper surface in the Z direction) may all be the same as those illustrated in FIG. 9(*c*) and, for example, heights of the first guide members 33*a* and the second guide members 33*b* may be different. Heights of the first guide members 33*a* and the second guide members 33*b* may be appropriately determined according to a form of the pressing means 5.

As illustrated in FIG. 9(*a*), the first guide members 33*a* are both provided on an edge portion of the convex regions 33*d* and 33*d* of the convex member 33. Both of the first guide members 33*a* have a columnar shape that is substantially rectangular in a plan view oriented such that a length direction thereof runs along an edge portion of the convex member 33. An outer surface of both of the first guide members 33*a* functions as a guide for installing the convex member 33 in a prescribed position of the concave member 4.

As illustrated in FIG. 9(*a*), the second guide members 33*b* are provided on the four corners of the convex member 33 respectively. Each of the second guide members 33*b* has a substantially triangular prism shape. An inner surface of the first guide members 33*a* and an inner surface of the second guide members 33*b* function as guides for installing the pressing means 5 in a pressing means housing region 33*h* enclosed by the first guide members 33*a* and the second guide members 33*b*.

As illustrated in FIG. 9(*b*) to FIG. 9(*d*) and FIG. 9(*f*), a convex portion 33*c* that protrudes from the second surface is provided on the second surface (lower surface) side of the convex member 33. The convex portion 33*c* is provided in a belt shape so as to be attached between the two convex regions 33*d* and 33*d* of the convex member 33 in a plan view. Therefore, as illustrated in FIG. 9(*d*), a length L33 of the convex portion 33*c* is the same as a width of the convex member 33 in the X direction.

As illustrated in FIG. 9(*d*), the convex portion 33*c* has wide portions 33*f*, 33*f*, a center part 33*e*, and low regions 33*g*, 33*g*.

The wide portions 33*f*, 33*f* are disposed in the convex regions 33*d*, 33*d*. The center part 33*e* is arranged at the central portion between the wide portions 33*f*, 33*f*. The low regions 33*g*, 33*g* are each provided between the wide portions 33*f*, 33*f* and the center part 33*e*. As illustrated in FIG. 9(*c*), the low regions 33*g*, 33*g* protrude even less from the second surface than the center part 33*e*.

It is preferable that a low region 33*g* of the convex portion 33*c* be provided at a position overlapping the electrical supply line electrodes 31*e* and 31*f* of the heating member in a plan view. By laminating the convex member 33 and the heating member, a gap is formed in the low region 33*g* between the convex portion 33*c* and the heating member. In the case that the low region 33*g* is provided at a position overlapping the electrical supply line electrodes 31*e* and 31*f* of the heating member in a plan view, and in the heating member, the electrical supply line electrodes 31*e* and 31*f* are disposed on a surface on the convex member 33 side, as with the heating member 32 illustrated in FIG. 8(*a*) and FIG. 8(*b*), a gap between the convex portion 33*c* formed by the low region 33*g* and a heating member may be used as a region for connecting the electrical supply line electrode 31*e* of the heating member 32 and the electrical supply line 63*b*, and as a region for connecting the electrical supply line electrode 31*f* and the electrical supply line 64*b*.

A width D1 (see FIG. 9(*d*)) of the wide portions 33*f*, 33*f* of the convex portion 33*c* is the same as a width of the convex regions 33*d* and 33*d*. A width of the low regions 33*g*, 33*g* and a width D2 of the center part 33*e* are narrower on one side than the width D1 of the wide portions 33*f* and 33*f*. As illustrated in FIG. 16, the width D2 of the center part 33*e* is narrower than a width D3 (see FIG. 6(*a*)) in the Y direction of the heating member 31. Thus, a pressing force load of the pressing means 5 is efficiently applied to the cut part 23 of the fuse element 2 through the convex portion 33*c* and the heating member 31 of the convex member 33.

It is preferable that a ratio (D2:D3) of the width D2 of the center part 33*e* of the convex portion 33*c* and the width D3 of the heating member 31 in the Y direction be from 1:1.2 to 1:5, and it is even more preferable that the ratio be from 1:1.5 to 1:4. D2 is sufficiently narrower than D3 when a ratio of D2 and D3 is within the range described above, which allows the pressing force of the pressing means 5 to be efficiently transmitted to the cut part 23. Furthermore, when the ratio of D2 to D3 is within the range described above, it is preferable since a surface on the fuse element 2 side of the convex portion 33*c* and a surface on the convex portion 33*c* side of the fuse element 2 are disposed such that there is no difficulty in parallel disposition thereof caused by overly narrow D2. The pressing force of the pressing means 5 can be efficiently transmitted to the cut part 23 when the surface on the fuse element 2 side of the convex portion 33*c* and the surface on the convex portion 33*c* side of the fuse element 2 are disposed in parallel.

As illustrated in FIG. 9(*b*), in a height 33H of the convex portion 33*c*, a height of the wide portions 33*f*, 33*f* and the center part 33*e* are substantially the same, as illustrated in FIG. 9(*c*). As illustrated in FIG. 16, the height 33H of the convex portion 33*c* is shorter than a depth H46 of the concave portion 46 of the concave member 4.

It is preferable that the height 33H of the convex portion 33*c* be 0.1 to 0.8 times of the depth H46 of the concave portion 46 (33H/H46), and 0.2 to 0.6 times is more preferable. When the above ratio is within the range described above, a space between the two cut ends of the fuse element 2 is more reliably shielded by the convex portion 33*c* fitted within the concave portion 46. As a result, a distance between the two cut ends of the fuse element 2 lengthens, allowing continuation of arc discharge generated during cutting of the fuse element 2 to be suppressed in a short period of time.

A length L2 (see FIG. 18) of the center part 33*e* of the convex portion 33*c* illustrated in FIG. 9(*d*) is narrower than a length (width in the X direction) L3 (see FIG. 6(*a*) and FIG. 18) of the heating member 31. Thus, a pressing force load of the pressing means 5 is efficiently applied to the cut part 23 of the fuse element 2 through the convex portion 33*c* and the heating member 31 of the convex member 33. It is preferable that the length L2 of the center part 33*e* be of a length equal to or greater than that of the width 23D of the cut part 23 in the X direction (see FIG. 5 and FIG. 17(*b*)) so that the pressing force load of the pressing means 5 may be uniformly applied to the cut part 23.

The convex member 33 is composed of an insulating material capable of maintaining a hard state or an insulating material that undergoes substantially no deformation even at the softening temperature of the material of which the fuse element 2 is composed. Specifically, a ceramic material, a resin material having a high glass transition temperature, or the like can be used as the material of the convex member 33.

The glass transition temperature (Tg) of the resin material is a temperature at which the resin material changes from a soft rubber state to a hard glass state. When the resin is heated to the glass transition temperature or higher, the molecules move easily and form a soft rubber state. Meanwhile, when the resin is cooled, movement of the molecules is restricted and a hard glass state forms.

Alumina, mullite, zirconia, or the like can be given as examples of the ceramic material, and it is preferable that a material having high thermal conductivity such as alumina be used. When the convex member 33 is formed of a material having high thermal conductivity such as a ceramic material, heat generated when the fuse element 2 is cut can be efficiently radiated outside. As a result, continuation of arc discharge generated when the fuse element 2 is cut is more effectively suppressed.

An engineering plastic such as polyphenylene sulfide (PPS) resin, a nylon resin, fluorine resin, silicone resin, and the like can be given as examples of the resin material having a high glass transition temperature. Generally, resin material has lower thermal conductivity than ceramic material, but is inexpensive.

Of the resin materials, nylon resin is preferable due to having high tracking resistance (resistance to tracking (carbonized conduction path) breakdown). Of the nylon resins, use of nylon 46, nylon 6T, and nylon 9T is particularly preferable. Tracking resistance can be determined by a IEC60112-based test. Use of a nylon resin having a tracking resistance of 250 V or higher is preferable, and use of a nylon resin having a tracking resistance of 600 V or higher is more preferable.

The convex member 33 may, for example, be produced by a material other than resin such as a ceramic material, covering a portion of the convex portion 33*c* by a nylon resin.

The convex member 33 can be manufactured by a known method.

(Concave Member)

Figure 10:
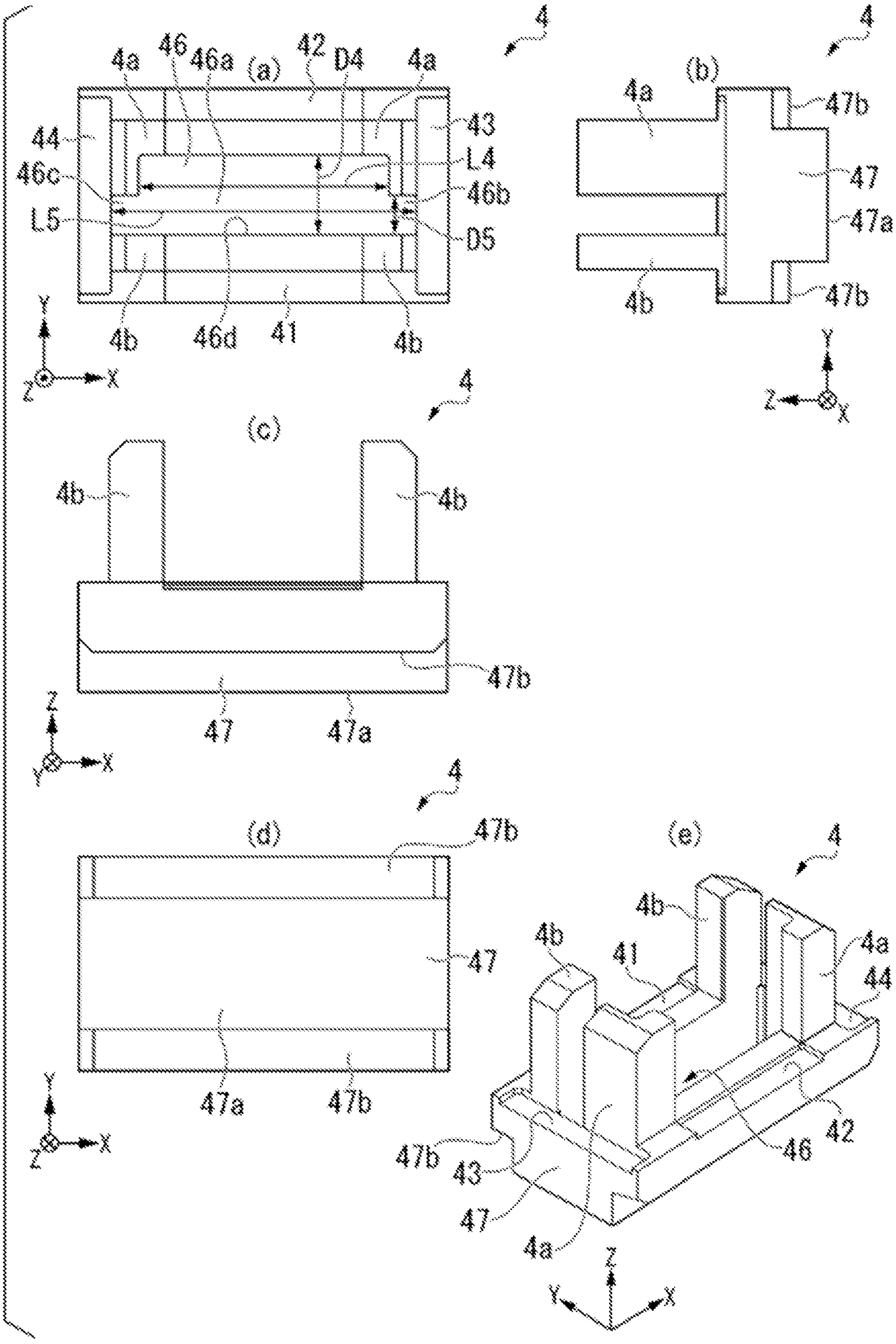
FIG. 10 is a drawing for describing a structure of the concave member 4 provided to the protective element 100 according to the first embodiment, FIG. 10(*a*) is a view seen from the first surface, FIG. 10(*b*) is a side surface view from seen from the X direction, FIG. 10(*c*) is a side surface view seen from the Y direction, FIG. 10(*d*) is a view seen from the second surface, and FIG. 10(*e*) is a perspective view.

FIG. 10 is a drawing for describing a structure of the concave member 4 provided to the protective element 100 of the first embodiment. FIG. 10(*a*) is a view seen from the first surface. FIG. 10(*b*) is a side surface view seen from the X direction. FIG. 10(*c*) is a side surface view seen from the Y direction. FIG. 10(*d*) is a view seen from the second surface. FIG. 10(*e*) is a perspective view.

As illustrated in FIG. 10(*a*) and FIG. 10(*d*), the concave member 4 has a substantially rectangular shape in the plan view, the long side direction being the X direction.

As illustrated in FIG. 10(*a*) to FIG. 10(*c*) and FIG. 10(*e*), terminal installation regions 41, 42, 43, and 44, a concave portion 46, first guide members 4*a*, and second guide members 4*b* are provided on the first surface (upper surface) side of the concave member 4.

The terminal installation regions 41, 42, 43, and 44 are substantially the same shape and are composed of a plane lower than the peripheral height provided in a belt shape along each side of the concave member 4 that is substantially rectangular in the plan view.

As illustrated in FIG. 1 and FIG. 4, a coupling portion between a first end portion 21 and a first terminal 61 of the fuse element 2 is placed in the terminal installation region 41. The difference between the height of the terminal installation region 41 and the peripheral height is set to a height corresponding to the thickness of the first terminal 61. A coupling portion between a second end portion 22 and a second terminal 62 of the fuse element 2 is placed in the terminal installation region 42. The difference between the height of the terminal installation region 42 and the peripheral height is set to a height corresponding to the thickness of the second terminal 62. A coupling portion between a third terminal 63 and an electrical supply line 63*b* is placed on the terminal installation region 43. The difference between the height of the terminal installation region 43 and the peripheral height is set to a height corresponding to the thickness of the third terminal 63. A coupling portion between a fourth terminal 64 and an electrical supply line 64*b* is placed on the terminal installation region 44. The difference between the height of the terminal installation region 44 and the peripheral height is set to a height corresponding to the thickness of the fourth terminal 64.

As illustrated in FIG. 10(*a*) and FIG. 10(*e*), the first guide members 4*a*, 4*a* and the second guide members 4*b*, 4*b* are disposed on the inner side of the region surrounded by the terminal installation regions 41, 42, 43, and 44 in the plan view so as to contact the terminal installation region 43 or the terminal installation region 44. The first guide members 4*a*, 4*a* have a substantially L-shaped column shape in the plan view. The second guide members 4*b*, 4*b* have a substantially rectangular column shape in the plan view. The two second guide members 4*b*, 4*b* are disposed on one long side of opposing long sides in the concave member 4 having a substantially rectangular shape in the plan view. The first guide members 4*a*, 4*a* and the second guide members 4*b*, 4*b* function as guides for installing the convex member 33 in a prescribed position of the concave member 4.

The heights (lengths from the upper surface in the Z direction) of the first guide members 4*a*, 4*a* and the second guide members 4*b*, 4*b* are substantially the same, as illustrated in FIG. 10(*c*). Heights of the first guide members 4*a*, 4*a* and the second guide members 4*b*, 4*b* may be appropriately determined according to the shape within a housing part 65 of the case 6, as illustrated in FIG. 3.

As illustrated in FIG. 10(*a*) and FIG. 10(*e*), the concave portion 46 is provided in a center part of the concave member 4 in the plan view. The concave portion 46 has a wide portion 46*a* having a wide width and narrow portions 46*b* and 46*c* which are arranged so as to interpose the wide portion 46*a* and have a narrower width only on the side with the first guide members 4*a*, 4*a* than the wide portion 46*a*. As illustrated in FIG. 10(*a*), the narrow portion 46*b* contacts the terminal installation region 43, the first guide members 4*a*, and the second guide members 4*b*. The narrow portion 46*c* contacts the terminal installation region 44, the first guide members 4*a*, and the second guide members 4*b*.

A width D4 (see FIG. 10(*a*) and FIG. 16) in the Y direction in the wide portion 46*a* of the concave portion 46 is wider than the width D1 (not illustrated in FIG. 16; see FIG. 9(*d*)) of wide portions 33*f*, 33*f* in the convex portion 33*c* and the width D2 (see FIG. 16) of the center part 33*e* of the convex member 33, and is wider than the width D3 (see FIG. 16) in the Y direction of the heating member 31. Furthermore, the length L4 (see FIG. 10(*a*) and FIG. 18) in the X direction in the wide portion 46*a* of the concave portion 46 is longer than the length L33 (see FIG. 18) of the convex portion 33*c* of the convex member 33 and is longer than the length (width in the X direction) L3 (see FIG. 18) of the heating member 31. Moreover, as illustrated in FIG. 16, the cut part 23, the heating member 31, and the convex portion 33*c* of the convex member 33 are disposed at a position within the wide portion 46*a* of the concave portion 46 in the plan view. That is, the convex portion 33*c* is disposed at a position where the outer periphery overlaps with at least a portion of the area of the inner side of the concave portion 46 in the plan view and overlaps with a portion of the cut part 23. In the protective element 100 of the present embodiment, from among the outer surface of the convex portion 33*c* in the Y direction, the surface continuously formed between the wide portion 33*f* and the center part 33*e* is disposed, in the plan view, along one of the inner surfaces of the inner wall surface 46*d* facing the concave portion 46 in the Y direction. Therefore, in the protective element 100 of the present embodiment, due to the cut part 23 being cut, as illustrated in FIG. 15(*b*) and FIG. 17(*b*), the convex portion 33*c* of the convex member 33 is inserted into the wide portion 46*a* of the concave portion 46, as well as the heating member 31 being housed therein.

As illustrated in FIG. 3, an edge portion on the first end portion 21 side in the cut part 23 of the fuse element 2 is disposed at a position near the inner wall surface 46*d* of the concave portion 46 in the plan view illustrated in FIG. 10(*a*), and a length L4 in the X direction in the wide portion 46*a* of the concave portion 46 is longer than a width 23D in the X direction (see FIG. 5 and FIG. 17(*b*)) in the cut part 23. Therefore, when the cut part 23 is cut, as illustrated in FIG. 15(*b*) and FIG. 17(*b*), the fuse element 2 divided by the cut part 23 is housed in the concave portion 46 so that a part thereof is folded.

When the inner wall surface 46*d* of the concave portion 46 and the edge portion on the first end part 21 side of the cut part 23 are disposed in close proximity in the plan view, the distance between them is about, for example, 0.1 to 0.5 mm, preferably 0.2 to 0.4 mm. When both are disposed in close proximity, once the convex portion 33*c* of the convex member 33 is inserted into the wide part 46*a* of the concave portion 46, the edge portion of the first end part 21 side of the cut part 23 is inserted while contacting the inner wall surface 46*d* of the concave portion 46. As a result, the edge portion of the first end part 21 side of the cut part 23 is preferably easily cut. When the distance between the inner wall surface 46*d* of the concave portion 46 and the edge portion on the first end part 21 side in the cut part 23 is 0.2 mm or greater in the plan view, it is preferable because transmitting the heat from the cut part 23 to the concave portion 46, and thereby interfering with the softening of the fuse element 2 can be prevented.

Furthermore, a width D5 (see FIG. 10(*a*) and FIG. 16) in the Y direction in the narrow portions 46*b* and 46*c* of the concave portion 46 is wider than the width in the Y direction of the electrical supply lines 63*b* and 64*b* (see FIG. 6(*a*)). Moreover, a length L5 (see FIGS. 10(*a*) and 18) in the X direction of the overall concave portion 46 is longer than the length (width in the X direction) L3 (see FIG. 18) of the heating member 31. Thus, as illustrated in FIG. 17(*b*), due to the cut part 23 being cut, portions of the electrical supply lines 63*b* and 64*b* that are cut in conjunction with the cutting of the cut part 23 and separated from the cut part 23 are housed in the concave portion 46 so as to bend along the edge portion of the concave portion 46.

Furthermore, as illustrated in FIG. 16, the width (length in the Y direction) D3 in the Y direction of the heating member 31 is shorter than the dimension of the depth (length in the Z direction) H46 of the concave portion 46. Therefore, the heating member 31 does not bend even when the cut part 23 is cut, and as illustrated in FIG. 15(*b*) and FIG. 17(*b*), is housed in the concave portion 46 while maintaining its overall shape.

As illustrated in FIG. 10(*b*) to FIG. 10(*d*), a convex portion 47 is disposed in a belt shape in the length direction of the concave member 4 in the center part of the second surface (bottom surface) 47*b* side of the concave member 4. A top part 47*a* of the convex portion 47 is exposed from the case 6.

A material similar to the convex member 33 can be used as the material of the concave member 4. From the perspective of low cost and tracking resistance, a nylon resin or a fluorine resin is preferably used as the material of the concave member 4. The material of the concave member 4 and the material of the convex member 33 may be the same or different.

When the concave member 4 is formed of a material having high thermal conductivity such as a ceramic material, heat generated when the fuse element 2 is cut can be efficiently radiated outside, and continuation of arc discharge generated when the fuse element 2 is cut is more effectively suppressed.

The concave member 4 may, for example, be produced by a material other than resin such as a ceramic material, covering a portion of the concave portion 46 by a nylon resin.

The concave member 4 can be manufactured by a known method.

(Pressing Means)

The pressing means 5 apply a force so as to shorten the relative distance in the direction in which the movable member 3 and the concave member 4 interpose the cut part 23 (Z direction). The pressing means 5 in the protective element 100 of the present embodiment apply a force so as to shorten the relative distance in the direction in which the convex member 33 of the movable member 3 and the concave member 4 interpose the cut part 23 (Z direction).

For example, known means capable of imparting elastic force, such as a spring or rubber, can be used as the pressing means 5.

In the protective element 100 of the present embodiment, a spring is used as the pressing means 5. The spring (pressing means 5) is placed on the pressing means housing region 33*h* of the convex member 33 illustrated in FIG. 9(*e*) and held in a contracted state.

A known material may be used for the spring used as the pressing means 5.

A cylindrical spring or a conical spring may be used as the spring used as the pressing means 5. When a conical spring is used as the pressing means 5, the side having a small outer diameter may be disposed facing the cut part 23, or the side having a large outer diameter may be disposed facing the cut part 23.

As illustrated in FIG. 3, a conical spring is preferably used as the spring used as the pressing means 5 because the contraction length can be shortened. Furthermore, when a conical spring is used as the pressing means 5, it is more preferable that the side having the small outer diameter be disposed facing the cut part 23 side. Thus, for example, when the spring is formed of a conductive material such as metal, continuation of arc discharge generated when the fuse element 2 is cut can be more effectively suppressed. This is because the distance between the location where arc discharge is generated and the conductive material forming the spring can be easily ensured. Furthermore, it is preferable when a conical spring is used as the pressing means 5 and the side having the large outer diameter is disposed facing the cut part 23 side because an elastic force be uniformly applied by the movable member 3 from the pressing means 5.

In the protective element 100 of the present embodiment, only one pressing means 5 is installed on the movable member 3 side of the cut part 23, but a plurality of pressing means 5 may be installed on the movable member 3 side of the cut part 23.

When the protective element 100 is provided with a plurality of pressing means 5, an elastic force of the entire protective element 100 may be adjusted by making the degree of contraction of each pressing means 5 different.

(Case)

As illustrated in FIG. 1, FIG. 3, and FIG. 4, the case 6 in the protective element 100 of the present embodiment houses the pressing means 5, the movable member 3, the fuse element 2, and the concave portion 46 of the concave member 4. As illustrated in FIG. 1 to FIG. 4, the case 6 is composed of two members: a first case 6*a*; and a second case 6*b* that is disposed facing and joined to the first case 6*a*. As illustrated in FIG. 1 to FIG. 4, the first case 6*a* and the second case 6*b*, which are part of the material of the case 6, are the same.

Figure 11:
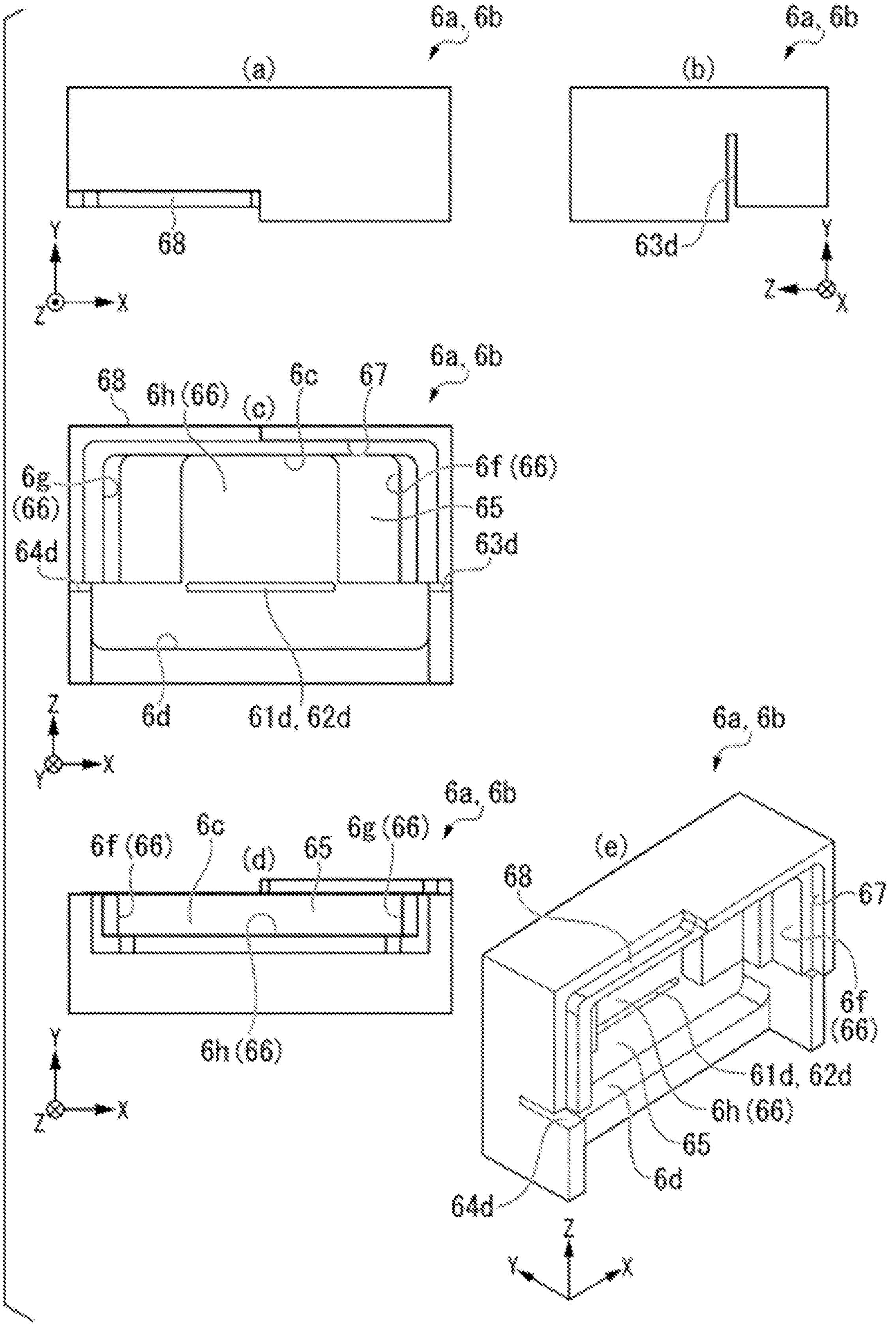
FIG. 11 is a drawing for describing a structure of the first case 6*a* and the second case 6*b* provided to the protective element 100 according to the first embodiment, FIG. 11(*a*) is a view seen from the pressing means 5 side, FIG. 11(*b*) is a side surface view seen from the X direction, FIG. 11(*c*) is a side surface view seen from the Y direction, FIG. 11(*d*) is a view seen from the concave member 4 side, and FIG. 11(*e*) is a perspective view.

FIG. 11 is a drawing for describing a structure of the first case 6*a* and the second case 6*b* provided to the protective element 100 of the first embodiment. FIG. 11(*a*) is a view seen from the pressing means 5 side (upper side). FIG. 11(*b*) is a side surface view seen from the X direction. FIG. 11(*c*) is a side surface view seen from the Y direction. FIG. 11(*d*) is a view seen from the concave member 4 side (lower side). FIG. 11(*e*) is a perspective view.

As illustrated in FIG. 11(*a*) to FIG. 11(*d*), the first case 6*a* and the second case 6*b* each have a substantially rectangular parallelepiped shape in which the length of the surface in the Y direction is shorter than the length of the surface in the X direction.

As illustrated in FIG. 3, housing parts 65 that are integrated by joining the first case 6*a* and the second case 6*b* are respectively formed in the first case 6*a* and the second case 6*b*. The housing part 65 functions as a holding frame for holding the pressing means 5 in a contracted state. That is, the pressing means 5 are housed in the case 6 in a state where a force is applied so as to shorten a relative distance the direction in which the cut part 23 of the fuse element 2 is interposed between the movable member 3 and the concave member 4. As illustrated in FIG. 11(*a*) to FIG. 11(*d*), in the first case 6*a* and the second case 6*b*, one of the two surfaces extending in the X direction is a surface disposed opposingly and is an opening of the housing part 65.

As illustrated in FIG. 11(*c*), the housing part 65 of the first case 6*a* and the second case 6*b* has a first inner wall surface 6*c*, a second inner wall surface 6*d*, and a side wall surface 66, respectively. The first inner wall surface 6*c*, the second inner wall surface 6*d*, and the side wall surface 66 in each housing part 65 are integrally formed of the same member. The first inner wall surface 6*c*, the second inner wall surface 6*d*, and the side wall surface 66 are integrated. The first case 6*a* and the second case 6*b* support and hold the internal stress of the case 6 generated by the pressing means 5 via the convex member 33 and the fuse element 2 in a staple shape by means of the first inner wall surface 6*c*, the side wall surface 66, and the second inner wall surface 6*d*, respectively, without the fuse element 2 being cut. The protective element 100 of the first embodiment is provided with a heating member 31. Therefore, the first case 6*a* and the second case 6*b* support and hold the internal stress of the case 6 generated by the pressing means 5 via the convex member 33, the heating member 31, and the fuse element 2 in a staple shape by means of the first inner wall surface 6*c*, the side wall surface 66, and the second inner wall surface 6*d*, respectively, without the fuse element 2 being cut.

As illustrated in FIG. 11(*c*) to FIG. 11(*e*), the first inner wall surface 6*c* and the second inner wall surface 6*d* are disposed opposing the expansion and contraction direction (Z direction) of the pressing means 5. The first inner wall surface 6*c* forms a top surface of the housing part 65. As illustrated in FIG. 15(*a*) and FIG. 17(*a*), the first inner wall surface 6*c* is disposed in contact with the pressing means 5. The second inner wall surface 6*d* forms the bottom surface of the housing part 65. As illustrated in FIG. 15(*a*), the second inner wall surface 6*d* is disposed in contact with the second surface (lower surface) 47*b* of the concave member 4.

The first inner wall surface 6*d* and the second inner wall surface 6*c* form a frame-like structure together with the integrated side wall surface 66 and hold the pressing means 5 in a contracted state. Furthermore, the first case 6*a* and the second case 6*b* are joined while disposed facing each other by applying an adhesive to the steps 67 and 68 illustrated in FIG. 11(*c*) and FIG. 11(*e*). Therefore, in the protective element 100 of the present embodiment, stress from the pressing means 5 in a contracted state is not applied to the joint surface, which is, for example, different from a situation where a case that has an opening that opens in the expansion and contraction direction (Z direction) of the pressing means 5 is used and a lid is joined to the opening using an adhesive. Therefore, in the protective element 100 of the present embodiment, the pressing means 5 can be stably held in a contracted state, and the pressing force of the pressing means 5 can be held for a long period of time.

As illustrated in FIG. 11(*c*) to FIG. 11(*e*), the side wall surface 66 joins the first inner wall surface 6*c* and the second inner wall surface 6*d* in the expansion and contraction direction (Z direction) of the pressing means 5. The side wall surface 66 forms a side surface of the housing part 65. As illustrated in FIG. 11(*c*) and FIG. 11(*e*), the sidewall surface 66 has a first sidewall surface 6*h* extending in the X direction, and a second sidewall surface 6*f* and a third sidewall surface 6*g* extending in the Y direction and oppositely disposed.

As illustrated in FIG. 11(*c*) and FIG. 11(*e*), an opening 61*d* (or 62*d*) which is a through hole having a substantially oval shape elongated in the X direction is provided in a center portion in the height direction (Z direction) in the X direction center of the first side wall surface 6*h*. The first terminal 61 (or the second terminal 62) is penetrated through the opening 61*d* (or 62*d*), as illustrated in FIG. 1 and FIG. 2(*a*) to FIG. 2(*d*). Therefore, the width and length of the opening 61*d* (or 62*d*) are determined according to the shape of the portion of the first terminal 61 (or the second terminal 62) that is exposed from the case 6.

As illustrated in FIG. 11(*c*), a long and narrow slit 63*d* is provided in the Y direction in a height direction (Z direction) center portion in an edge portion of the second side wall surface 6*f*. The width of the second side wall surface 6*f* in the Y direction is wider at a portion above the slit 63*d* than at a portion below the slit 63*d*.

A slit 64*d* elongated in the Y direction is provided in the center in the height direction (Z direction) at the edge of the third side wall surface 6*g*. The width of the third side wall surface 6*g* in the Y direction is narrower in the portion above the slit 64*d* than in the portion below the slit 64*d*.

The edge of the second side wall surface 6*f* of the first case 6*a* is integrated by being joined to the edge of the third side wall surface 6*g* of the second case 6*b* to form one side surface extending in the Y direction of the case 6. Furthermore, the edge portion of the third side wall surface 6*g* of the first case 6*a* is integrated by being joined to the edge portion of the second side wall surface 6*f* of the second case 6*b* to form the other side surface that extends in the Y direction of the case 6.

The slit 64*d* and the slit 63*d* are connected by joining the first case 6*a* and the second case 6*b*. Thus, openings which is substantially oval shaped through holes that are elongated in the Y direction are formed in each of the two side surfaces that extend in the Y direction of the case 6. The third terminal 63 (or the fourth terminal 64) is penetrated through the formed opening. Accordingly, the width and length of the slit 64*d* and the slit 63*d* are determined according to the shape of the portion of the third terminal 63 (or the fourth terminal 64) exposed from the case 6.

As illustrated in FIG. 11(*a*), FIG. 11(*c*), and FIG. 11(*e*), the thickness of the edge portion on the first inner wall surface 6*c* side of the slit 64*d* in the third side wall surface 6*g* is thinner from the center position in the X direction in the edge portion of the first inner wall surface 6*c*, and a step 68 is formed with the extension surface of the outer surface. From the X direction center position at the edge of the first inner wall surface 6*c*, the edge on the first inner wall surface 6*c* side is thinner than the slit 63*d* in the second side wall surface 6*f*, and a step 67 is formed on the extension surface of the inner surface. The steps 67 and 68 formed continuously with the edges of the first inner wall surface 6*c* and the side wall surface 66 are joined surfaces between the first case 6*a* and the second case 6*b*. The steps 67 and 68 prevent positional displacement when the first case 6*a* and the second case 6*b* are joined, and increase the joining surface to improve the joining strength.

As illustrated in FIG. 1 and FIG. 3, the shapes of the first inner wall surface 6*c*, the second inner wall surface 6*d*, and the side wall surface 66 are formed corresponding to shapes where the pressing means 5, the movable member 3, the fuse element 2, and the concave member 4 in a contracted state are laminated.

The case 6 in the present embodiment, as illustrated in FIG. 2(*a*) to FIG. 2(*d*) and FIG. 3, is used by a first case 6*a* and a second case 6*b* being disposed and joined facing each other. The pressing means 5 are housed in the case 6 in a contracted state.

A material similar to that of the convex member 33 can be used as the material of the case 6. The material of the case 6 and the material of the convex member 33 may be the same or different.

When the case 6 is formed of a material having high thermal conductivity such as a ceramic material, heat generated when the fuse element 2 is cut can be efficiently radiated outside. Therefore, continuation of arc discharge generated when the fuse element 2 is cut is more effectively suppressed.

The case 6 can be manufactured by a known method.

(Manufacturing Method of Protective Element)

Next, an example of the manufacturing method of the protective element 100 of the present embodiment will be described.

Figure 12:
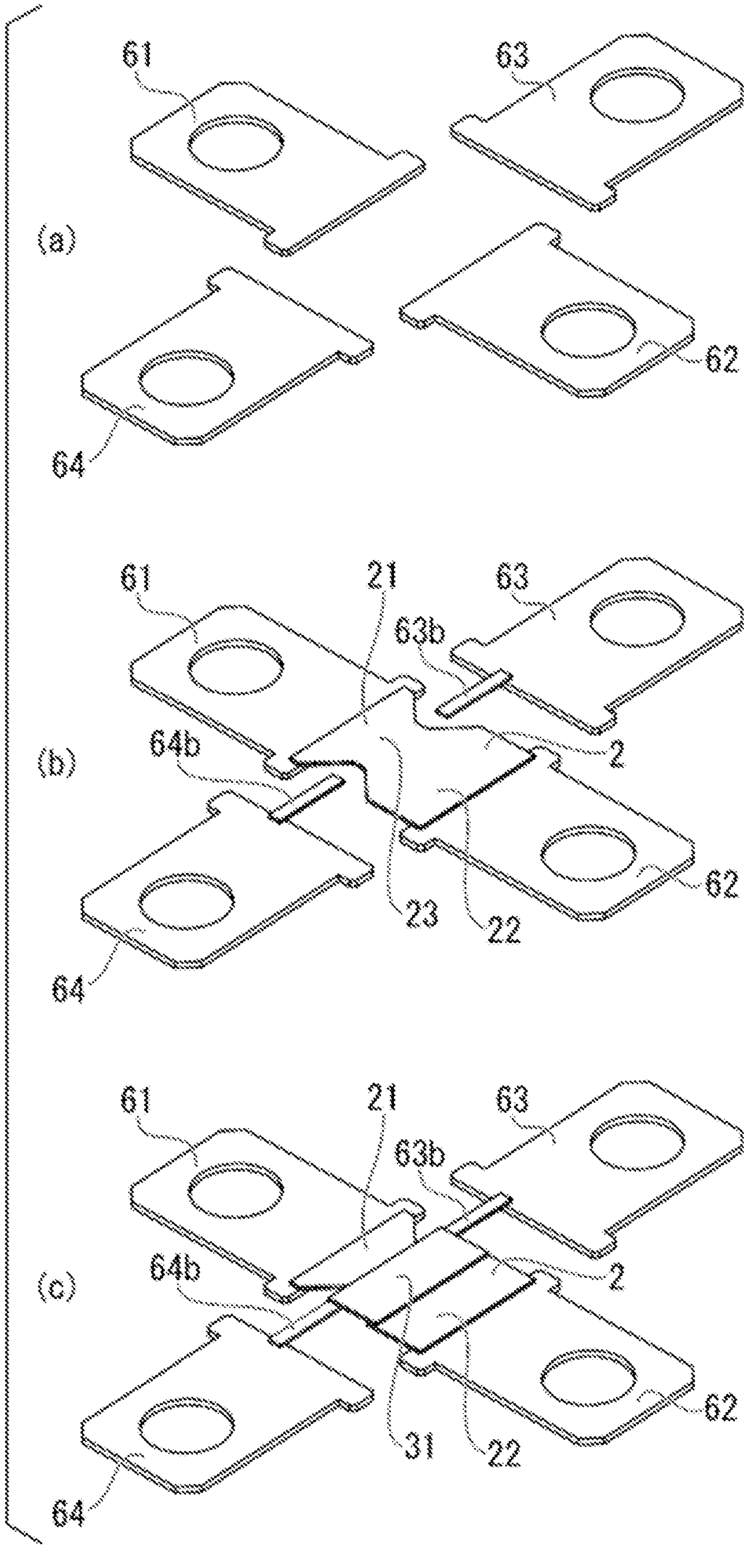
FIG. 12 is a process diagram for describing an example of a manufacturing method of the protective element 100 of the first embodiment.
Figure 13:
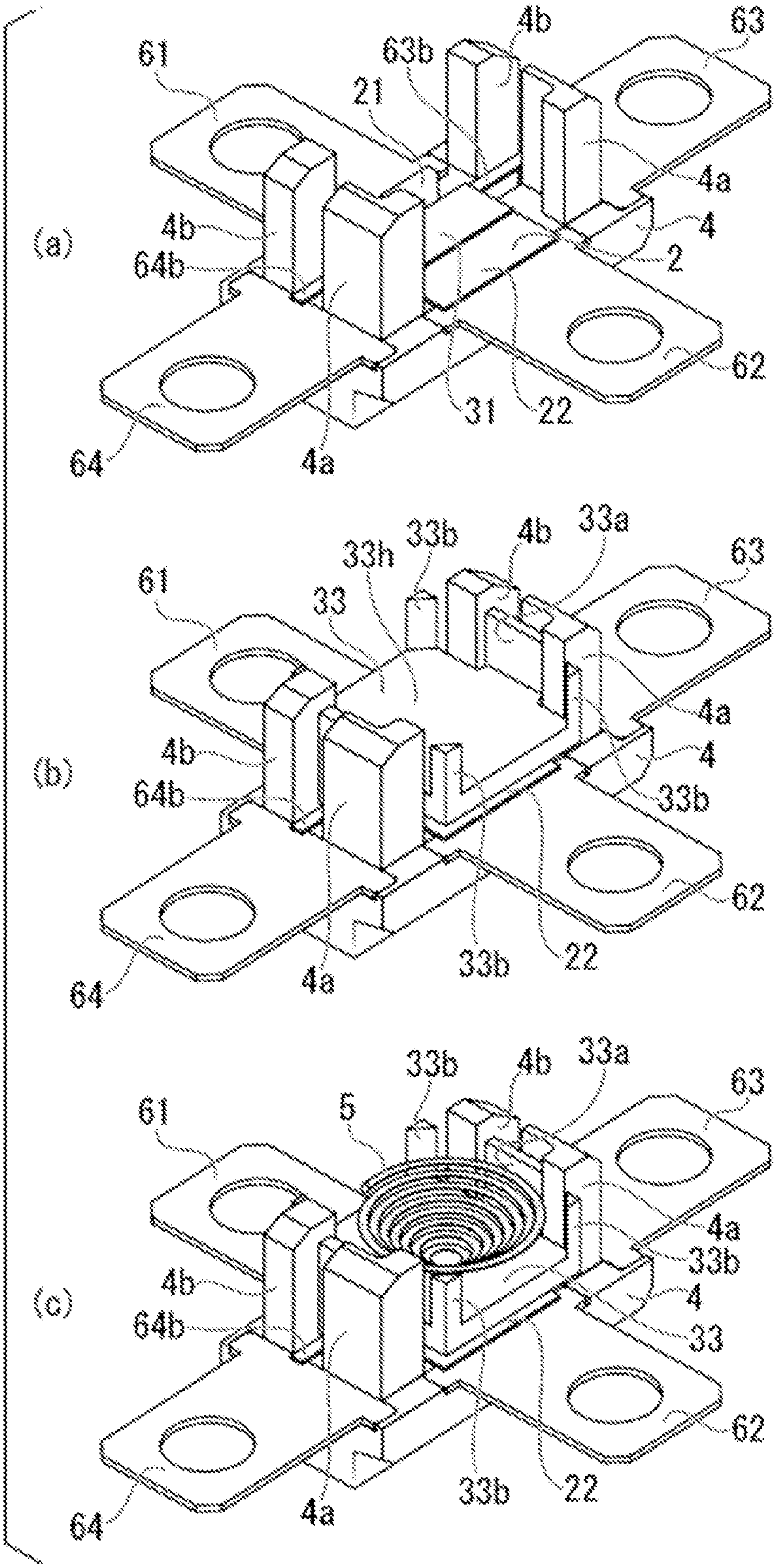
FIG. 13 is a process diagram for describing the example of the manufacturing method of the protective element 100 of the first embodiment.
Figure 14:
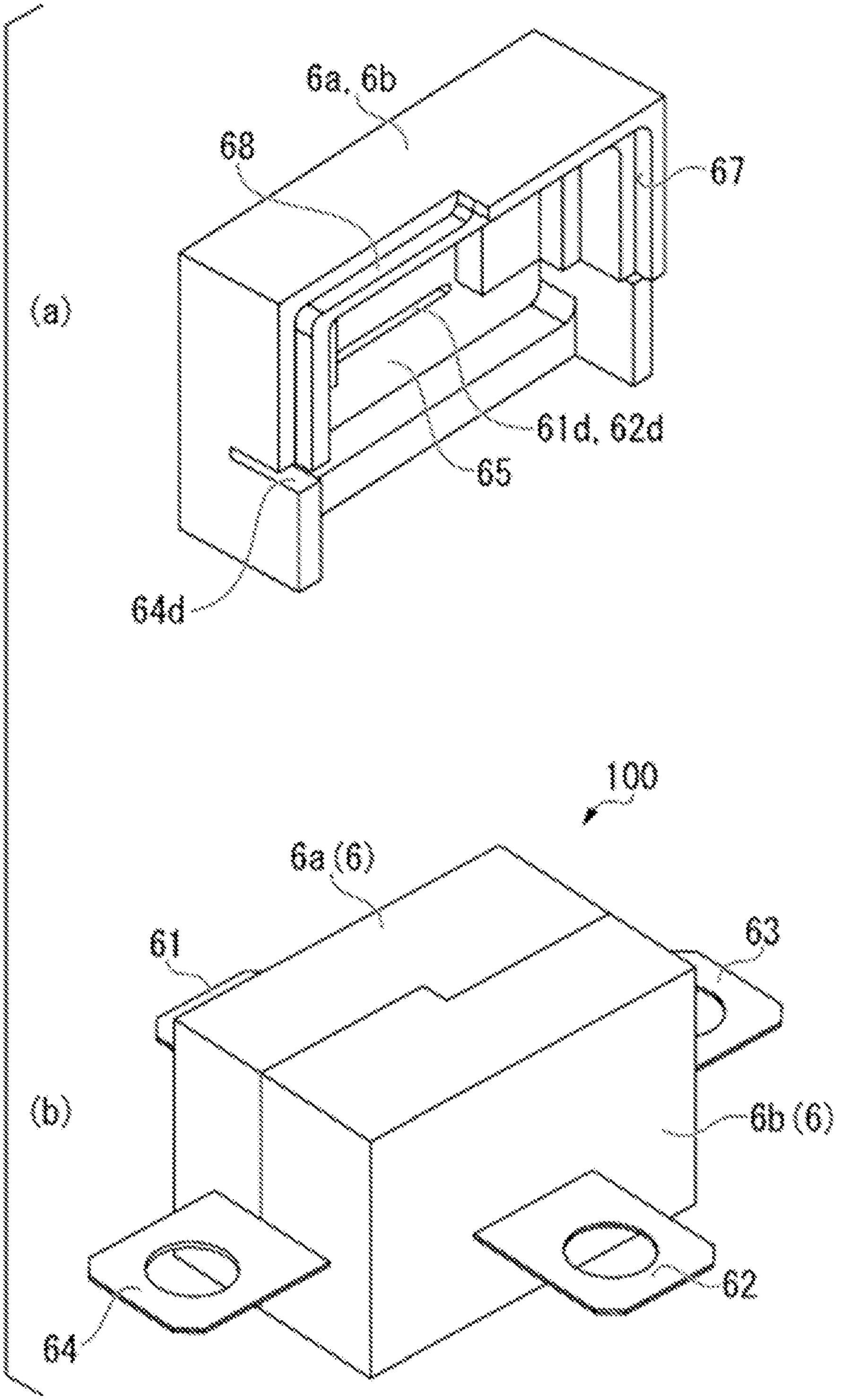
FIG. 14 is process diagram for describing the example of the manufacturing method of the protective element 100 of the first embodiment.

FIG. 12 to FIG. 14 are process diagrams for describing an example of a manufacturing method of the protective element 100 of the first embodiment.

In order to manufacture the protective element 100 of the present embodiment, as illustrated in FIG. 12(*a*), a first terminal 61, a second terminal 62, a third terminal 63, and a fourth terminal 64 are prepared.

Next, the fuse element 2 illustrated in FIG. 5 is prepared. Then, as illustrated in FIG. 12(*b*), the first end part 21 of the fuse element 2 is connected to the first terminal 61 by soldering. A second end part 22 is connected onto the second terminal 62 by soldering. A known solder material can be used as the solder material used in soldering in the present embodiment, and from the perspective of resistivity and melting point, it is preferable to use a solder material containing Sn as a main component.

The first end portion 21 and the second end portion 22, and the first terminal 61 and the second terminal 62 may be connected by welding, or may be connected by mechanical joining such as rivet joining, screw joining, or the like, and a known joining method may be used.

Next, electrical supply lines 63*b* and 64*b* are prepared. Then, as illustrated in FIG. 12(*b*), the electrical supply line 63*b* is connected by soldering onto the third terminal 63. The electrical supply line 64*b* is connected onto the fourth terminal 64 by soldering. The electrical supply lines 63*b* and 64*b*, the third terminal 63, and the fourth terminal 64 may be connected by welding, and a known joining method can be used.

Next, the heating member 31 illustrated in FIG. 7(*a*) to FIG. 7(*c*) is prepared. Then, as illustrated in FIG. 12(*c*), the electrical supply line electrodes 31*e* and 31*f* (not illustrated in FIG. 12(*c*)) disposed on the second surface (lower surface in FIG. 12(*c*)) of the heating member 31 are connected to the electrical supply lines 63*b* and 64*b* by, for example, a soldering method. Furthermore, an element connecting electrode 31*d* (not illustrated in FIG. 12(*c*)) disposed on the second surface (lower surface in FIG. 12) of the heating member 31 is connected to the fuse element 2 by, for example, a soldering method.

Next, the concave member 4 illustrated in FIG. 10(*a*) to FIG. 10(*e*) is prepared. Then, as illustrated in FIG. 13(*a*), the heating member 31 is placed on the concave portion 46 of the concave member 4. At the same time, the first terminal 61, the second terminal 62, the third terminal 63, and the fourth terminal 64 are installed in the terminal installation region 41, the terminal installation region 42, the terminal installation region 43, and the terminal installation region 44, respectively.

Next, the convex member 33 illustrated in FIG. 9(*a*) to FIG. 9(*f*) is prepared. Further, as illustrated in FIG. 13(*b*), the convex member 33 is disposed on the heating member 31 with the convex portion 33*c* facing the heating member 31 side. At this time, the first guide members 33*a* of the convex portion 33*c* are installed between the first guide members 4*a* and the second guide members 4*b* of the concave member 4.

Next, as illustrated in FIG. 13(*c*), the pressing means 5 are installed in the pressing means housing region 33*h* of the convex member 33. In the present embodiment, as illustrated in FIG. 13(*c*), a conical spring is used as the pressing means 5. The conical spring is installed in the pressing means housing region 33*h* with the side having the small outer diameter facing the cut part 23 side.

Next, as illustrated in FIG. 14(*a*), the first case 6*a* and the second case 6*b* are prepared (see FIG. 11(*a*) to FIG. 11(*e*)). Then, the first terminal 61 penetrates through the opening 61*d* of the first case 6*a*. The first case 6*a* and the second case 6*b* are disposed facing each other, and the second terminal 62 is passed through the opening 62*d* of the second case 6*b*.

Thereafter, the first case 6*a* and the second case 6*b* are joined. When the first case 6*a* and the second case 6*b* are joined, the step 67 formed continuously with the edge of the first inner wall surface 6*c* and the side wall surface 66 of the first case 6*a* and the step 68 formed continuously with the edge of the first inner wall surface 6*c* and the side wall surface 66 of the second case 6*b* are joined. A step 67 formed in the second case 6*b* is joined to a step 68 formed in the first case 6*a*.

An adhesive agent can be used as needed for joining the first case 6*a* and the second case 6*b*. As the adhesive, for example, an adhesive containing a thermosetting resin can be used.

Furthermore, when joining the first case 6*a* and the second case 6*b*, the first case 6*a* and the concave member 4 and/or the second case 6*b* and the concave member 4 may be joined using an adhesive as needed.

When joining the first case 6*a* and the second case 6*b*, as illustrated in FIG. 3, the second surface (bottom surface) 47*b* of the concave member 4 is disposed so as to contact the second inner wall surface 6*d* of the first case 6*a* and the second case 6*b*. Furthermore, as illustrated in FIG. 3, the pressing means 5 are disposed in a contracted state so as to contact the first inner wall surface 6*c* of the first case 6*a* and the second case 6*b*. Thus, the pressing means 5 in a contracted state is housed in the housing part 65 of the case 6.

Further, when joining the first case 6*a* and the second case 6*b*, a third terminal 63 (or a fourth terminal 64) is inserted into a slit 63*d* of the first case 6*a* and a slit 64*d* of the second case 6*b* disposed facing each other. As a result, by joining the first case 6*a* and the second case 6*b*, a portion of the third terminals 63 (or the fourth terminals 64) comes to be exposed to the outside of the case 6 from the opening formed by connecting the slit 64*d* and the slit 63*d* (see FIG. 14(*b*)).

The protective element 100 of the present embodiment is obtained by the above steps.

(Operation of Protective Element)

Next, an operation of the protective element 100 in a situation where a current exceeding a rated current flows through the fuse element 2 of the protective element 100 of the present embodiment will be described using the drawings.

FIG. 15 to FIG. 18 are cross-section views for describing a state of the protective element 100 of the first embodiment before and after the cut part of the fuse element is cut. FIG. 15 is a cross-section view cut along the line A-A' of the protective element 100 of the first embodiment illustrated in FIG. 2. FIG. 16 is an enlarged cross-section view illustrating an enlargement of a portion of FIG. 15(*a*). FIG. 17 is a cross-section view cut along the line B-B' of the protective element 100 of the first embodiment illustrated in FIG. 2. FIG. 18 is an enlarged cross-section view illustrating an enlargement of a portion of FIG. 17(*a*). FIG. 15(*a*) and FIG. 17(*a*) are states before cutting. FIG. 15(*b*) and FIG. 17(*b*) are states after cutting.

When a current exceeding a rated current flows through the fuse element 2 of the protective element 100 of the present embodiment, the temperature of the fuse element 2 increases from overcurrent heating and heating by the heating member 31. The cut part 23 of the fuse element 2, which is softened by the increase in temperature, is cut by a pressing force from a pressing means 5 loaded through the convex portion 33*c* of the convex member 33 and the heating member 31, and the energization is cut off.

In the protective element 100, a cut part 23 of the fuse element 2 is cut at a softening temperature. That is, the cut part 23 is cut at a temperature at which the fuse element 2 softens before reaching a completely melted state or at a temperature at which the solid phase and the liquid phase are mixed. Accordingly, in the protective element 100, the amount of heat generated when the fuse element 2 is cut can be reduced as well as arc discharge itself generated during cutting of the cut part 23.

In the protective element 100 of the present embodiment, a load is applied to the fuse element 2 by pressing with the pressing means 5 via the convex portion 33*c* of the convex member 33 and the heating member 31. Thus, the configuration of the fuse element 2, the elastic force of the pressing means 5, and the like are properly set so as to prevent the fuse element 2 from being cut even when the temperature of the fuse element 2 is not higher than the softening temperature of the material constituting the fuse element 2.

The heating member 31 provided in the protective element 100 of the present embodiment has a heating part 31*b* that is energized by a current control element provided in an external circuit when an abnormality occurs in the external circuit serving as the energization path of the protective element 100 and it is necessary to cut off the energization path. Thus, when a current exceeding the rated current flows through the fuse element 2, the heating member 31 generates heat. Thus, when a current exceeding the rated current flows through the fuse element 2, the temperature of the fuse element 2 increases rapidly, and the cut part 23 of the fuse element 2 is quickly cut.

The arc discharge depends on the electric field intensity inversely proportional to the distance between the potentials. In the protective element 100 of the present embodiment, the distance between potentials means the shortest distance between both cut surfaces of the cut part 23.

In the protective element 100 of the present embodiment, the convex portion 33*c* of the convex member 33 is inserted into the concave portion 46 of the concave member 4 by the pressing force of the pressing means 5. The cut fuse element 2 is stored in the concave member 4 together with the convex portion 33*c* of the convex member 33 and the heating member 31. Thus, as illustrated in FIG. 15(*b*) and FIG. 17(*b*), the distance between the cut surfaces of the cut fuse element 2 is rapidly expanded. As a result, even when arc discharge is generated when the fuse element 2 is cut, the arc discharge will be quickly reduced. Therefore, the protective element 100 of the present embodiment can suppress continuation of arc discharge generated when the fuse element 2 is cut, even when installed, for example, in a current path of high voltage and high current.

In the protective element 100 of this embodiment, when the cut part 23 of the fuse element 2 is cut, as illustrated in FIG. 15(*b*) and FIG. 17(*b*), the fuse element 2 that is not in contact with a heating member 31 is bent along an edge of a concave portion 46. The fuse element 2 in contact with the heating member 31 is stored in the concave portion 46 together with the heating member 31. Therefore, physical cut off of the energization path through the fuse element 2 is ensured.

In the protective element 100 of the present embodiment, the convex portion 33*c* of the convex member 33 is inserted into the concave portion 46 of the concave member 4 by the pressing force from the pressing means 5. Thus, the electrical supply lines 63*b* and 64*b* are disconnected from the electrical supply line electrodes 31*e* and 31*f*, and the second end portion 22 of the fuse element 2 is housed in the concave portion 46 (see FIG. 15(*a*) and FIG. 15(*b*)). Therefore, when the fuse element 2 is cut, electrical supply to the heating member 31 is cut off, and heating of the heating member 31 is stopped. Therefore, the protective element 100 of the present embodiment has excellent safety.

As described above, the protective element 100 of the present embodiment is provided with a movable member 3 and a concave member 4 disposed facing each other such that a cut part 23 of the fuse element 2 is interposed therebetween, and pressing means 5 that apply a force such that the relative distance in the direction in which the cut part 23 is interposed between the movable member 3 and the concave member 4 shortens. Thus, the cut part 23 is cut at a temperature no lower than the softening temperature of the fuse element 2. As a result, in the protective element 100 of the present embodiment, the amount of heat generated when the fuse element 2 is cut can be reduced as well as arc discharge generated during cutting. Furthermore, in the protective element 100 of the present embodiment, the cut fuse element 2 is housed in the concave member 4 together with the movable member 3 due to the pressing force of the pressing means 5. Thus, the distance between the cut surfaces of the cut fuse element 2 is rapidly expanded. As a result, even when arc discharge is generated when the fuse element 2 is cut, the arc discharge will be quickly reduced.

Second Embodiment

Figure 19:
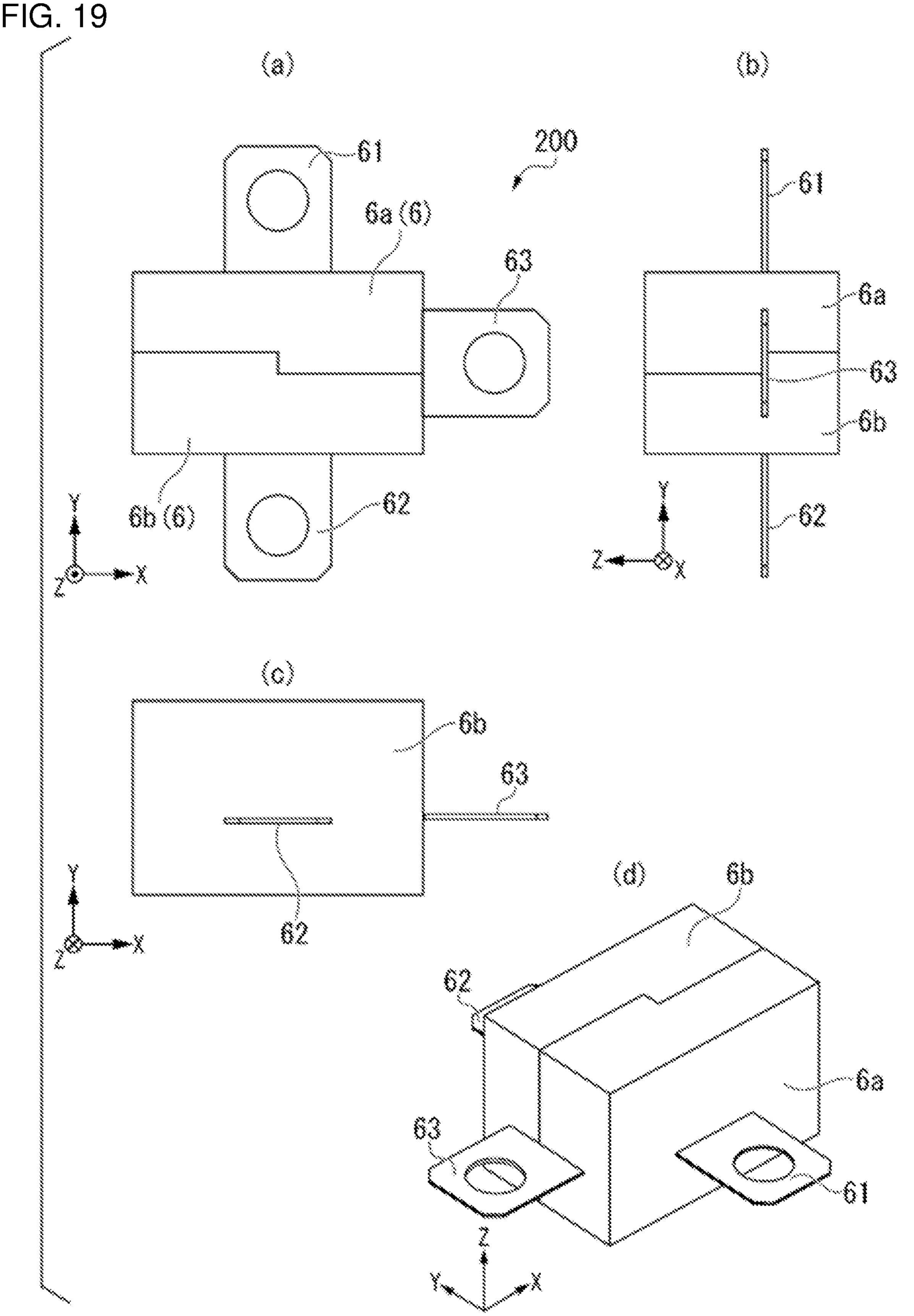
FIG. 19 is a drawing illustrating an appearance of the protective element 200 according to the second embodiment, FIG. 19(*a*) is a plan view, FIG. 19(*b*) and FIG. 19(*c*) are side surface views, and FIG. 19(*d*) is a perspective view.
Figure 20:
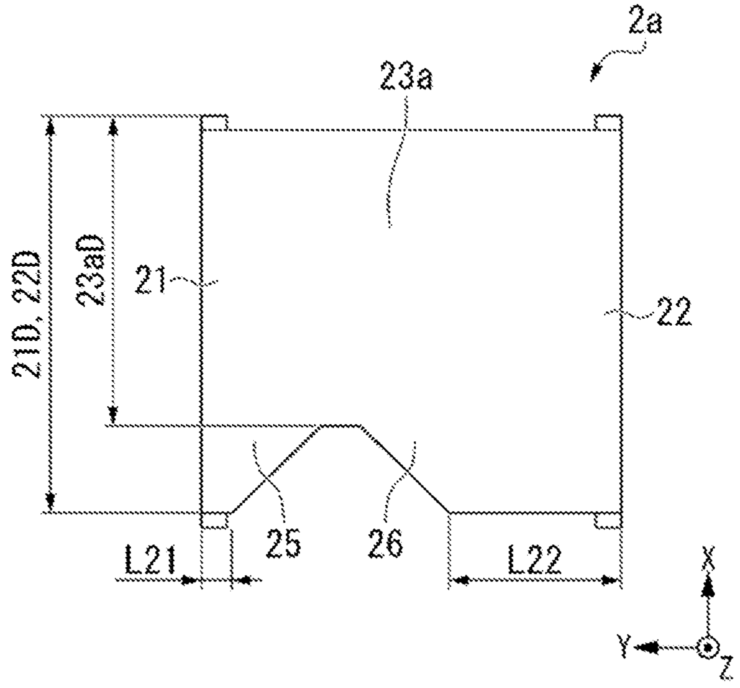
FIG. 20 is an enlarged view for describing a portion of the protective element 200 according to the second embodiment, being a plan view illustrating the fuse element 2*a*.
Figure 21:
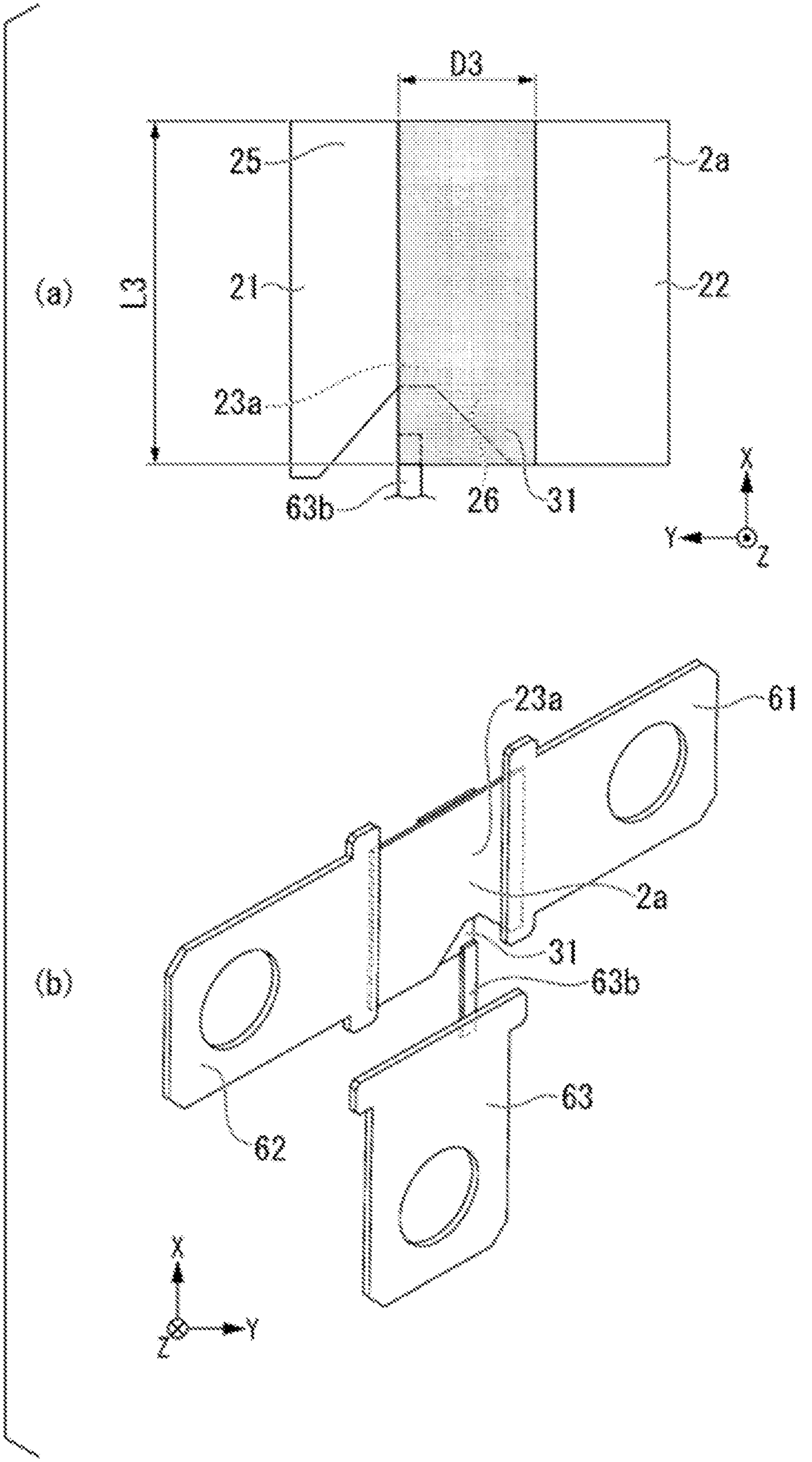
FIG. 21 is a drawing for describing a relationship between disposal of the fuse element 2*a* and the heating member 31 in the protective element 200 of the second embodiment, FIG. 21(*a*) is a plan view seen from the pressing means 5 side, and FIG. 21(*b*) is a perspective view seen from the concave member 4 side.

FIG. 19 is a drawing illustrating an appearance of the protective element 200 of the second embodiment. FIG. 19(*a*) is a plan view. FIG. 19(*b*) and FIG. 19(*c*) are side views. FIG. 19(*d*) is a perspective view. FIG. 20 is an enlarged view for describing a portion of the protective element 200 of the second embodiment, being a plan view illustrating the fuse element 2*a*. FIG. 21 is a drawing for describing a relationship between disposal of the fuse element 2*a* and the heating member 31 in the protective element 200 of the second embodiment. FIG. 21(*a*) is a plan view seen from the pressing means 5 side. FIG. 21(*b*) is a perspective view seen from the concave member 4 side.

In the protective element 200 of the second embodiment, members that are the same as the protective element 100 according to the first embodiment described above are given the same reference signs, and description thereof is omitted.

The protective element 200 of the second embodiment differs from the protective element 100 of the first embodiment only in that it does not have a fourth terminal 64 and an electrical supply line 64*b* in the protective element 100 and in a shape of a fuse element.

A fuse element 2*a* of the protective element 200 of the second embodiment has a cut part 23*a* provided between the first end portion 21 and the second end portion 22, like the fuse element 2 in the protective element 100 of the first embodiment (see FIG. 20, FIG. 21(*a*), and FIG. 21(*b*)). As illustrated in FIG. 20, a width 23*a*D in the X direction of the cut part 23*a* of the fuse element 2*a* is narrower than the width 21D in the X direction of the first end 21 and the width 22D in the X direction of the second end 22.

In the fuse element 2*a* in the present embodiment, unlike the fuse element 2 in the first embodiment, an edge portion on an upper side in FIG. 20 is made to be substantially a straight line. On the other hand, like the fuse element 2, a notch is provided on a portion corresponding to the cut part 23*a* of the edge portion on the lower side of the fuse element 2*a* in FIG. 20. Thus, as illustrated in FIG. 20, FIG. 21(*a*), and FIG. 21(*b*), the width 23*a*D of the cut part 23 is narrower than the width other than the cut part 23*a*.

In the protective element 200 of the second embodiment, like the protective element 100 of the first embodiment, an electrical supply line electrode 31*e* (see FIG. 7(*a*) to FIG. 7(*c*)) of the heating member 31 is electrically connected to the third terminal 63 by an electrical supply line 63*b* (see FIG. 21(*a*) and FIG. 21(*b*)). Meanwhile, in the protective element 200 of the second embodiment, unlike the protective element 100 of the first embodiment, the electrical supply line electrode 31*f* (see FIG. 7(*a*) to FIG. 7(*c*)) of the heating member 31 is electrically connected to the fuse element 2*a*.

Like the protective element 100 of the first embodiment, the protective element 200 of the second embodiment is provided with a movable member 3 and a concave member 4 disposed facing each other such that a cut part 23*a* of the fuse element 2*a* is interposed therebetween, and pressing means 5 that apply a force such that the relative distance in the direction in which the cut part 23 is interposed between the movable member 3 and the concave member 4 shortens. Therefore, in the protective element 200 of the second embodiment as well, like the protective element 100 of the first embodiment, arc discharge generated when the fuse element 2*a* is cut can be reduced, and arc discharge can be quickly reduced even if it does occur.

The protective element 200 of the second embodiment is described by giving an example of a situation where the heating member 31 illustrated in FIG. 7(*a*) to FIG. 7(*c*) is provided, but like the protective element 100 of the first embodiment, the protective element 200 of the second embodiment may be provided with the heating member 32 illustrated in FIG. 8(*a*) and FIG. 8(*b*) and may be provided with the heating member 310 illustrated in FIG. 8(*c*) and FIG. 8(*d*).

The protective element 200 of the second embodiment is described by giving an example of a case where the fuse element 2*a* illustrated in FIG. 20 is provided, but the fuse element 2 illustrated in FIG. 5 may be provided in the protective element 200 of the second embodiment as well, like the protective element 100 of the first embodiment. In this situation as well, like the protective element 200 of the second embodiment, the fourth terminal 64 and the electrical supply line 64*b* are not included, and the electrical supply line electrode 31*f* (see FIG. 7(*a*) to FIG. 7(*c*)) of the heating member 31 is electrically connected to the fuse element 2.

Third Embodiment

In the above described first embodiment and second embodiment, the embodiments are described where the heating member 31 is disposed on the pressing means 5 side of the fuse element 2 in contact with the cut part 23, but the heating member 31 may also be disposed on the concave member 4 side of the fuse element 2 in contact with the cut part 23.

Figure 22:
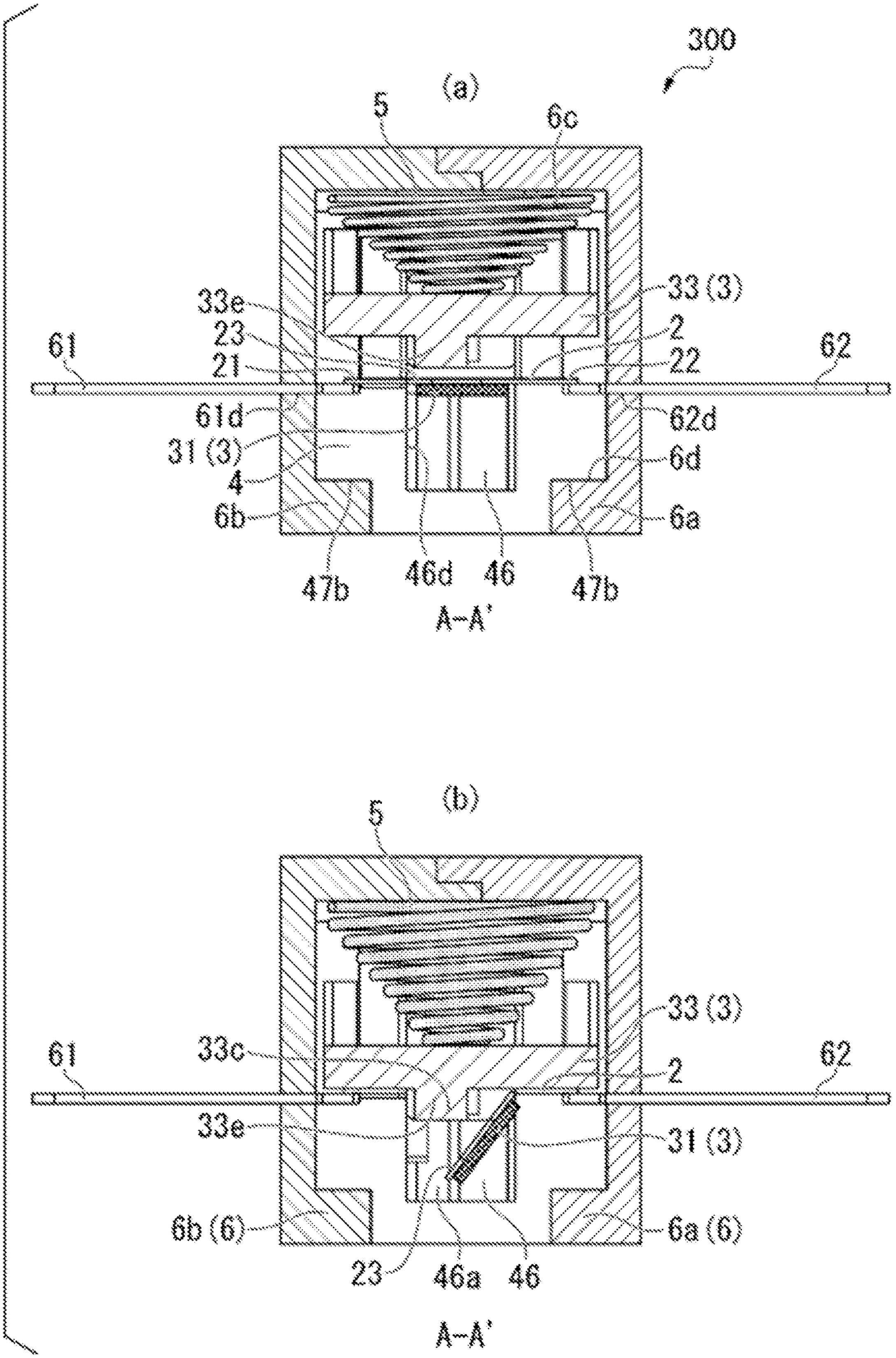
FIG. 22 is a cross-section view for describing states of the protective element 300 of the third embodiment before and after the cut part of the fuse element is cut, and is a cross-section view cut along a position corresponding to the line A-A' of the protective element 100 of the first embodiment illustrated in FIG. 2.

FIG. 22 is a cross-section view for describing a state of the protective element 300 of the third embodiment before and after the cut part of the fuse element is cut. FIG. 22 is a cross-section view cut along the positions corresponding to the line A-A' of the protective element 100 of the first embodiment illustrated in FIG. 2. FIG. 22(*a*) is a state before cutting. FIG. 22(*b*) is a state after cutting.

In the protective element 300 of the third embodiment, members that are the same as the protective element 100 of the first embodiment described above are given the same reference signs and description thereof is omitted.

The protective element 300 of the third embodiment is different from the protective element 100 of the first embodiment only in that the heating member 31 in the protective element 100 is disposed on the concave member 4 side of the fuse element 2 in contact with the cut part 23.

Therefore, with the protective element 300 of the third embodiment as well, like the protective element 100 of the first embodiment, arc discharge generated when the fuse element 2 is cut can be reduced, and arc discharge can be quickly reduced even if it does occur.

OTHER EMBODIMENTS

The protective element of the present invention is not limited to the protective elements of the first to third embodiments described above.

For example, in the first embodiment to the third embodiment described above, a description is given with protective elements 100, 200, and 300 having the heating member 31 as an example, but the heating member 31 is provided as needed and may not be provided.

Like the protective element 100 of the first embodiment described above, it is preferable that the cut part 23 be disposed in the concave portion 46 of the concave member 4 in the plan view and be disposed at a position adjacent to the inner surface of the concave portion 46 in the plan view even with a protective element where the heating member 31 is not provided. Furthermore, with the movable member 3 as well, like the protective element 100 of the first embodiment described above, it is preferable to have the convex portion 33*c* disposed at a position where the outer periphery overlaps with at least a portion of the area inside the concave portion 46 in the plan view.

Even when the protective element is not provided with the heating member 31, the cut part 23 is cut at a temperature no lower than the softening temperature of the fuse element 2. At this time, it is preferable that the convex portion part 33*c* is inserted into the concave portion 46 and a portion of the fuse element 2 is bent so as to be housed in the concave portion 46. This is because the distance between the two cut ends of the fuse element 2 lengthens, allowing continuation of arc discharge generated during cutting of the fuse element 2 to be suppressed in a short period of time.

(Operation of Protective Element)

Next, operation when a current exceeding a rated current flows through the fuse element 2 of the protective element not provided with the heating member 31 will be described.

In this case, when a current exceeding the rated current flows to the fuse element 2 of the protective element, the temperature of the fuse element 2 increases from overcurrent heating. The cut part 23 of the fuse element 2 softened by the increase in temperature is cut by the pressing force from the pressing means 5 loaded through the convex portion 33*c* of the convex member 33, and the energization is cut off.

In this protective element, a load is applied to the fuse element 2 by pressing with the pressing means 5 via the convex portion 33*c* of the convex member 33. Therefore, the convex portion 33*c* of the convex member 33 is inserted into the concave portion 46 of the concave member 4 by the pressing force of the pressing means 5. Then, the cut fuse element 2 is stored in the concave member 4 together with the convex portion 33*c* of the convex member 33. Thus, the distance between the cut surfaces of the cut fuse element 2 is rapidly expanded. As a result, even when arc discharge is generated when the fuse element 2 is cut, the arc discharge will be quickly reduced. Accordingly, the protective element can suppress continuation of arc discharge generated when the fuse element 2 is cut, even, for example, when it is installed in a current path of high voltage and high current.

REFERENCE SIGNS LIST

2, 2*a* Fuse element
3 Movable member
4 Concave member

4*a* First guide member
4*b* Second guide member
5 Pressing means
6 Case
6*a* First case
6*b* Second case
6*c* First inner wall surface
6*d* Second inner wall surface
6*h* First side wall surface
6*f* Second side wall surface
6*g* Third side wall surface
21 First end
22 Second end
23, 23*a* Cut part
25 First coupling part
26 Second coupling part
31, 32, 310 Heating member
31*a* Insulated substrate
31*b* Heating part
31*c* Insulating layer
31*d* Element connecting electrode
31*e*, 31*f* Electrical supply line electrode
33 Convex member
33*a* First guide member
33*b* Second guide member
33*c* Convex portion
33*d* Convex region
33*e* Center part
33*f* Wide portion
33*g* Low region
33*h* Pressing means housing region
41, 42, 43, 44 Terminal installation region
46 Concave portion
46*a* Wide portion
46*b*, 46*c* Narrow portion
46*d* Inner wall surface
47 Convex portion
47*a* Top portion
47*b* Second surface
61 First terminal
61*a*, 62*a*, 63*a*, 64*a* External terminal hole
61*c*, 62*c*, 63*c*, 64*c* Flange
61*d*, 62*d* Opening
62 Second terminal
63 Third terminal
63*b*, 64*b* Electrical supply line
63*d*, 64*d* Slit
64 Fourth terminal
65 Housing part
66 Side wall surface
100, 200, 300 Protective element

The invention claimed is:

1. A protective element, comprising:

a fuse element comprising a first end, a second end, and a cut part positioned between the first end and the second end, the fuse element being energized in a first direction from the first end to the second end;

a movable member and a concave member disposed facing each other such that the cut part is interposed therebetween;

a press to apply a force to the movable member in a pressing direction in which a distance between the movable member and the concave member shortens;

a heating member comprising a resistor, having a plate shape, and disposed either contacting or near the cut part on a press side or a concave member side of the fuse element; and an electrical supply member connected to the resistor, the resistor of the heating member being heated by being energized through the electrical supply member, wherein the heating member is configured to be energized to directly heat the fuse element to a temperature at or above a softening temperature of the fuse element such that the cut part of the fuse element is softened and the force of the press cuts the cut part of the fuse element and a connection between the resistor and the electrical supply member.

2. The protective element according to claim 1, wherein a width of the cut part in a second direction of the fuse element is narrower than a width of a part other than the cut part in the second direction of the fuse element, the second direction being orthogonal to the first direction.

3. The protective element according to claim 1, wherein the cut part is disposed in a concave portion of the concave member in a plan view and is disposed at a position near an inner surface of the concave portion in the plan view, and a length in a second direction, which is orthogonal to the first direction, of the concave portion is longer than a length in the second direction of the cut part.

4. The protective element according to claim 1, wherein the heating member is disposed inside a concave portion of the concave member in a plan view.

5. The protective element according to claim 4, wherein a length in the first direction of the heating member is shorter than a length of the concave portion in a third direction, the third direction being orthogonal to the first direction and a second direction orthogonal to the first direction.

6. The protective element according to claim 1, wherein the fuse element is a laminated body which comprises:

an inner layer comprising a first metal; and an outer layer disposed on an outer side of the laminated body compared to the inner layer and comprising a second metal, the second metal having a higher melting point than the first metal.

7. The protective element according to claim 6, wherein the first metal is composed of Sn or a metal in which Sn is a primary component thereof, and the second metal is composed of Ag or Cu or a metal in which Ag or Cu is a primary component thereof.

8. The protective element according to claim 1, wherein the press is a spring.

9. The protective element according to claim 8, wherein the spring has a conical shape and a side having a small diameter of the conical shape faces toward the cut part.

10. The protective element according to claim 1, wherein the movable member has a convex portion disposed at a position in which at least a portion of an area inside the concave portion is overlapped with an outer periphery of the convex portion in a plan view, and the convex portion is inserted into the concave portion in a state in which the cut part is cut.

11. The protective element according to claim 1, further comprising: a first terminal electrically connected to the first end; and a second terminal electrically connected to the second end.

12. The protective element according to claim 1, further comprising:

a third terminal connected to the electrical supply member; and optionally a fourth terminal connected to the electrical supply member, wherein the heating member is electrically connected to the third terminal or to the third terminal and the fourth terminal via the electrical supply member, and the resistor of the heating member is heated by being energized through the electrical supply member.

13. The protective element according to claim 1, further comprising a case composed of a plurality of members in which at least the fuse element, the movable member, a concave portion of the concave member, and the press are housed, wherein the press is housed within the case in a state in which the force is applied to the movable member in the pressing direction in which the movable member and the concave member shortens.

14. The protective element according to claim 13, wherein one member of the case comprises a housing part, the housing part being integrally formed, using the same material, from a first inner wall surface and a second inner wall surface that face each other in the pressing direction and a side wall surface connecting the first inner wall surface and the second inner wall surface, the housing part supporting and holding stress in the case generated by the press in a staple shape by the first inner wall surface, the side wall surface, and the second inner wall surface in a state in which the fuse element is uncut.

15. The protective element according to claim 13, wherein material of at least one of the concave member and the case comprises nylon or ceramic.

16. The protective element according to claim 1, wherein the cut part is disposed in a concave portion of the concave member in the plan view and is disposed at the position near an inner surface of the concave portion in the plan view, the movable member has a convex portion disposed at the position in which at least a portion of an area inside the concave portion is overlapped with an outer periphery of the convex portion and in which the convex portion is overlapped with a portion of the cut part, in the plan view, and in a state in which the cut part is cut, the convex portion is inserted into the concave portion and a portion of the fuse element is bent so as to be housed within the concave portion.

17. The protective element according to claim 1, wherein the heating member is disposed contacting the cut part on the press side or the concave member side of the fuse element, and in a state in which the cut part is cut, the heating member is in an unbroken state and a part of the fuse element is stored in the concave portion together with the heating member.

* * * * *